May 24, 1938.  E. N. LOWRY  2,118,710
BOTTLE CAPPING MACHINE
Filed Aug. 22, 1934   17 Sheets-Sheet 1

WITNESS
J. T. Mains

INVENTOR
Edward N. Lowry
BY
Hoquet & Neary
ATTORNEYS

May 24, 1938.  E. N. LOWRY  2,118,710
BOTTLE CAPPING MACHINE
Filed Aug. 22, 1934   17 Sheets-Sheet 2
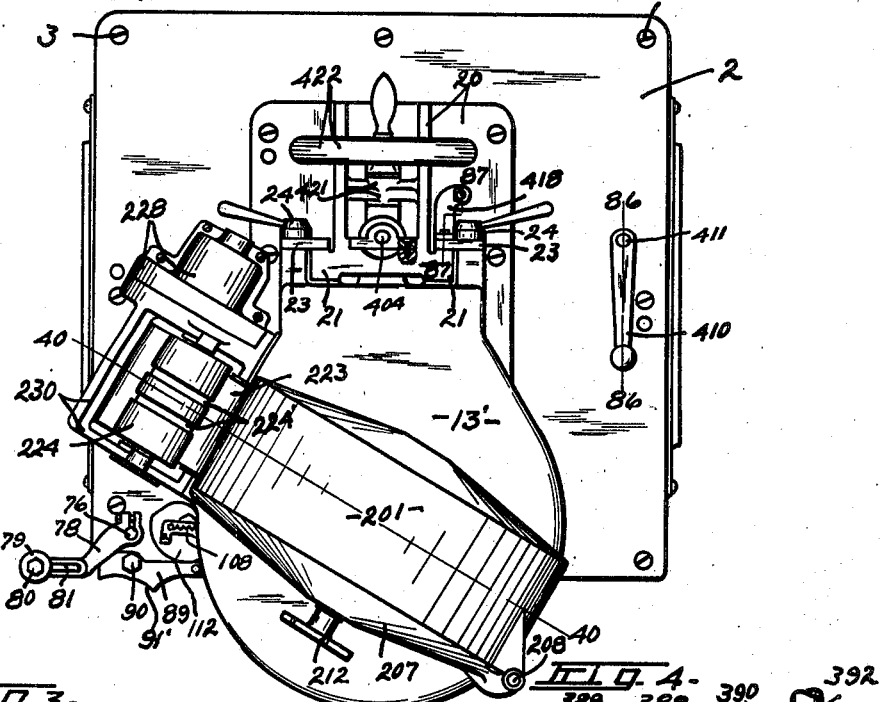
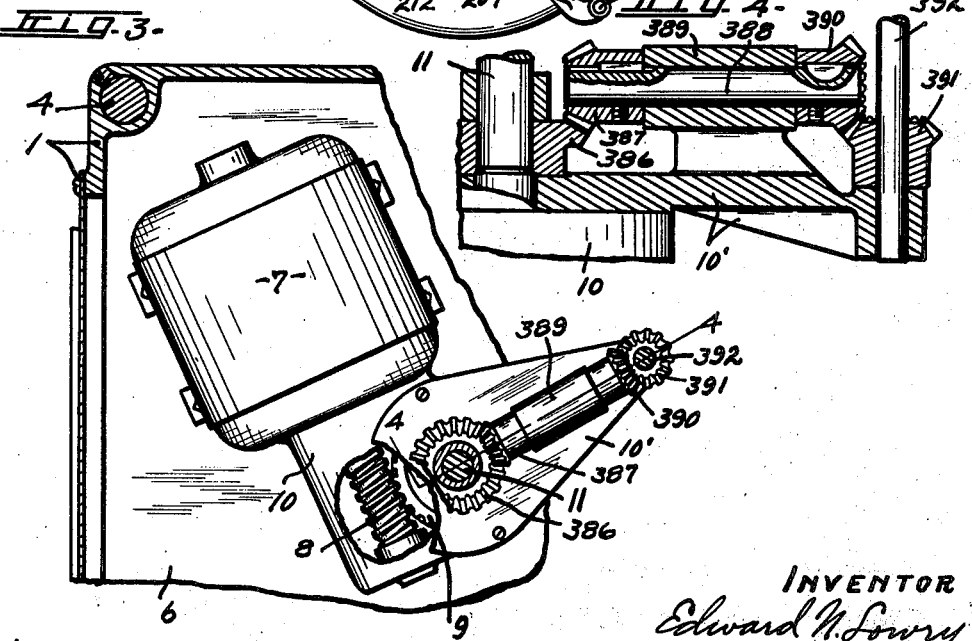

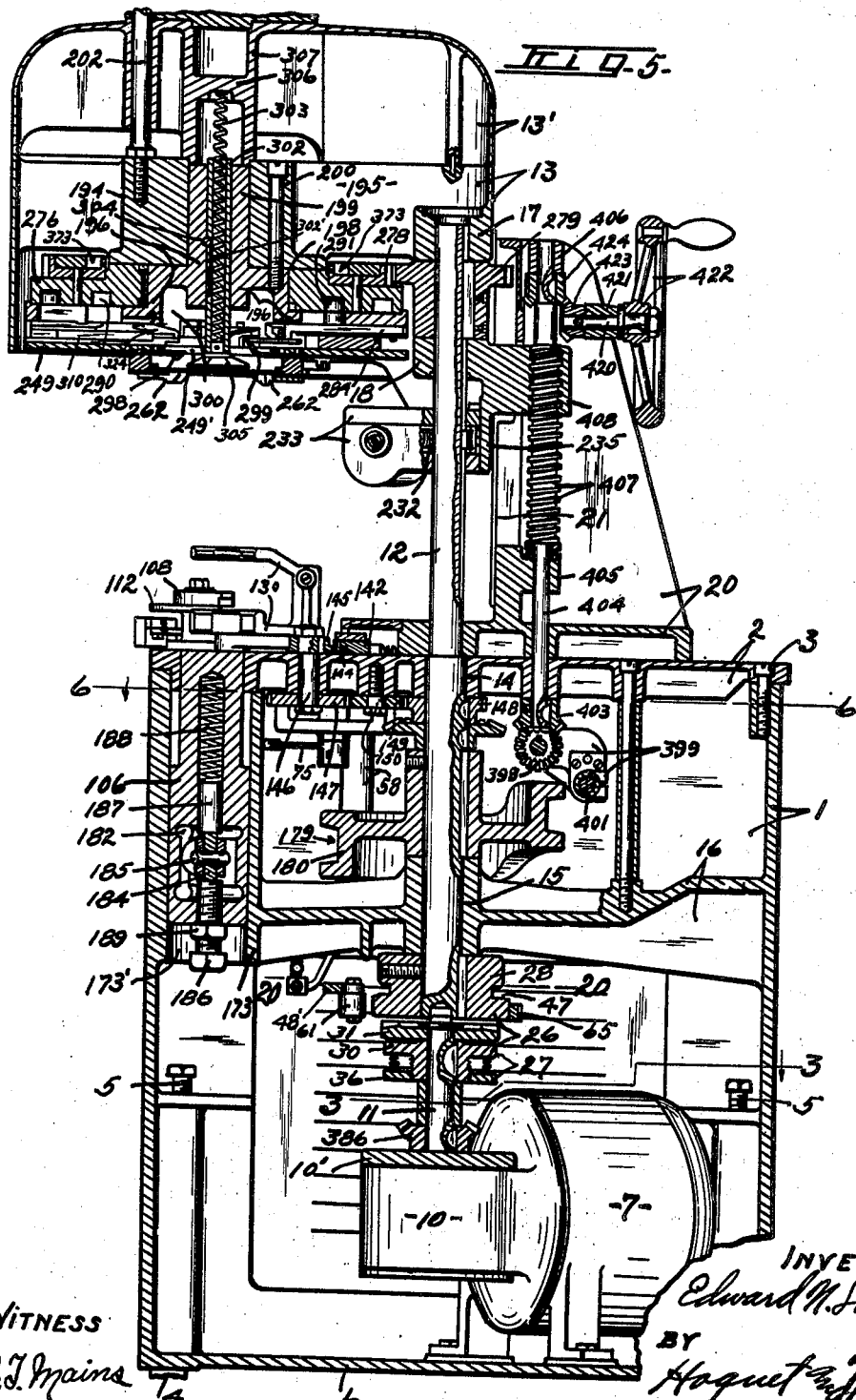

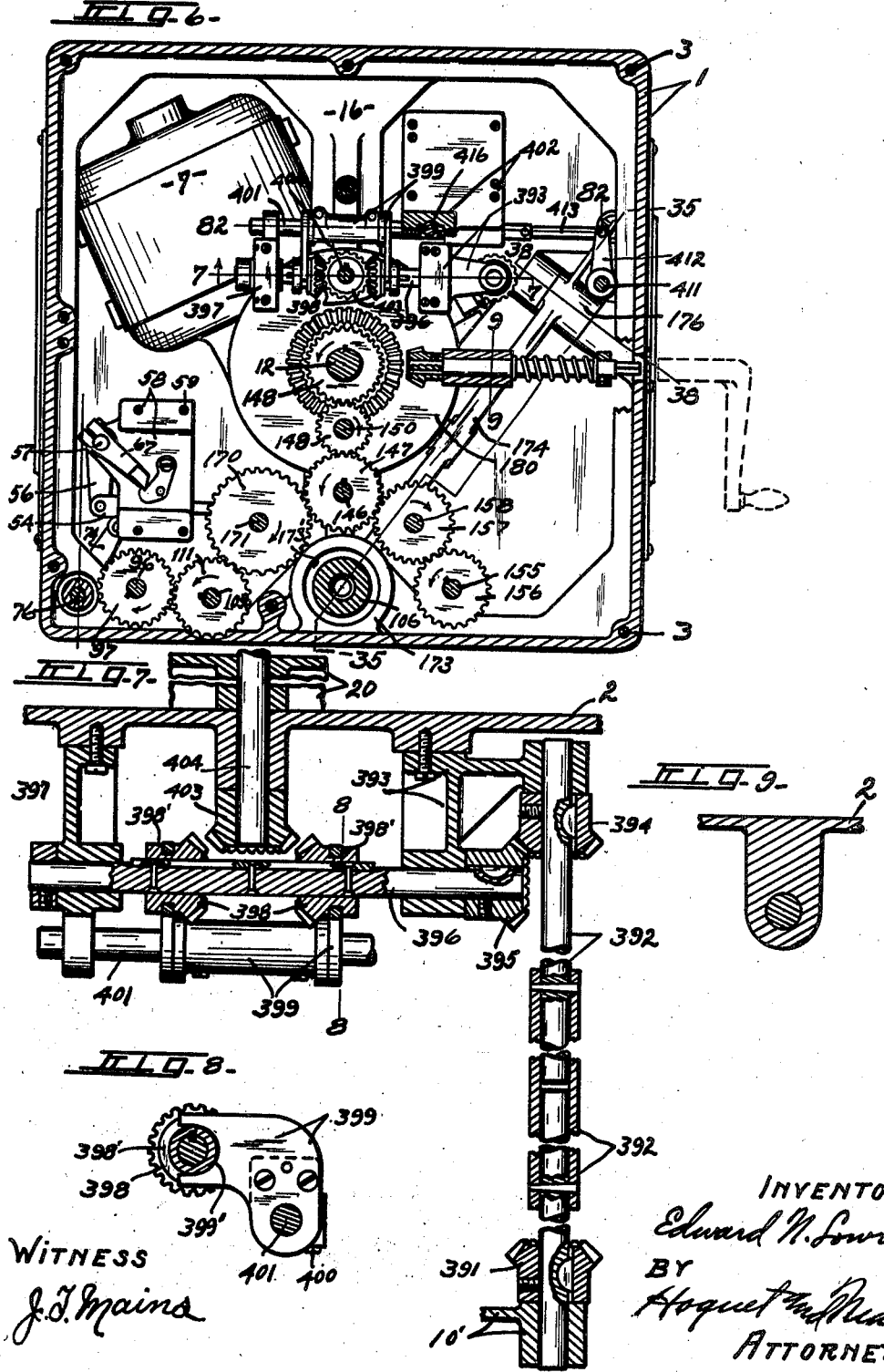

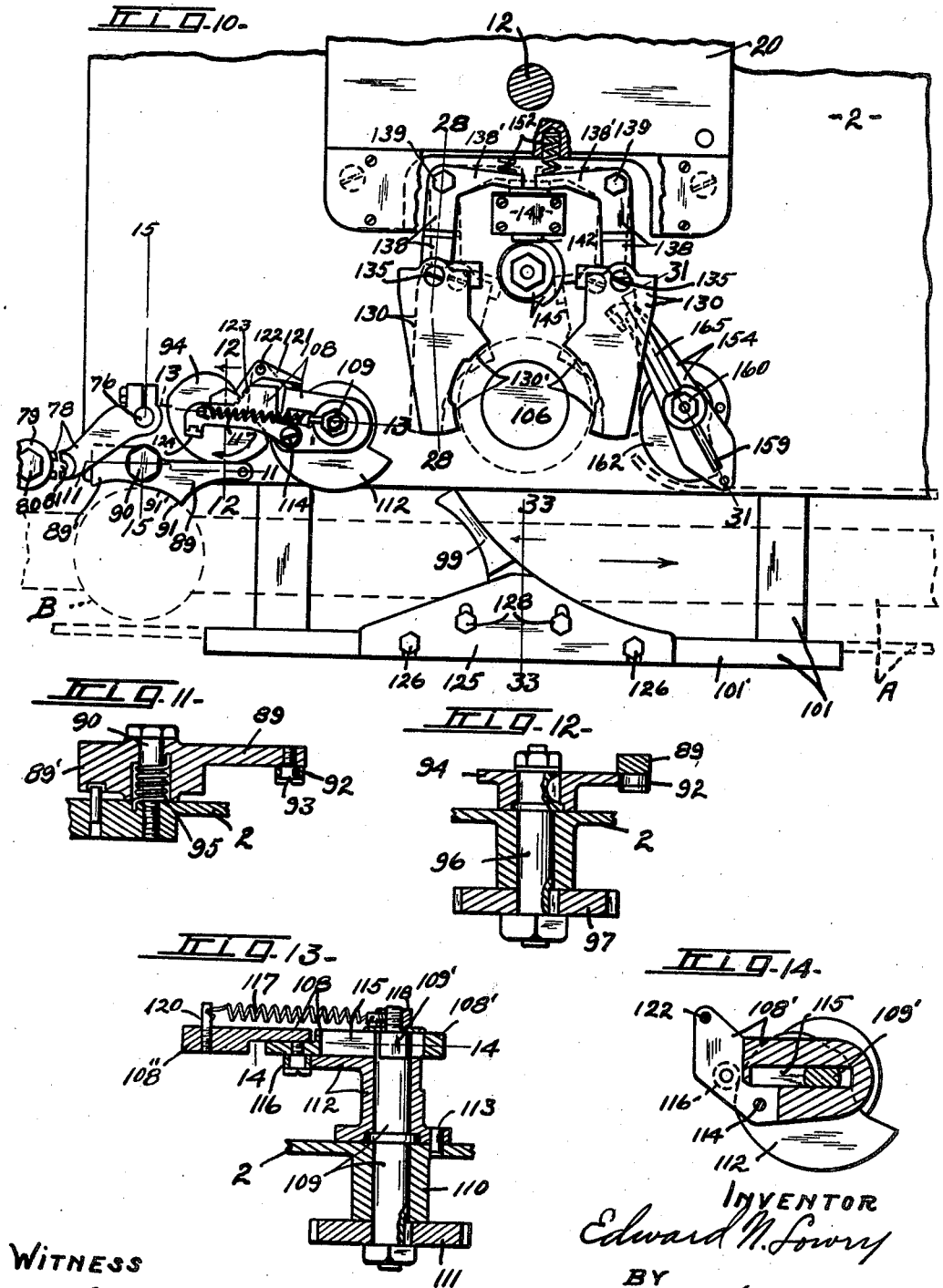

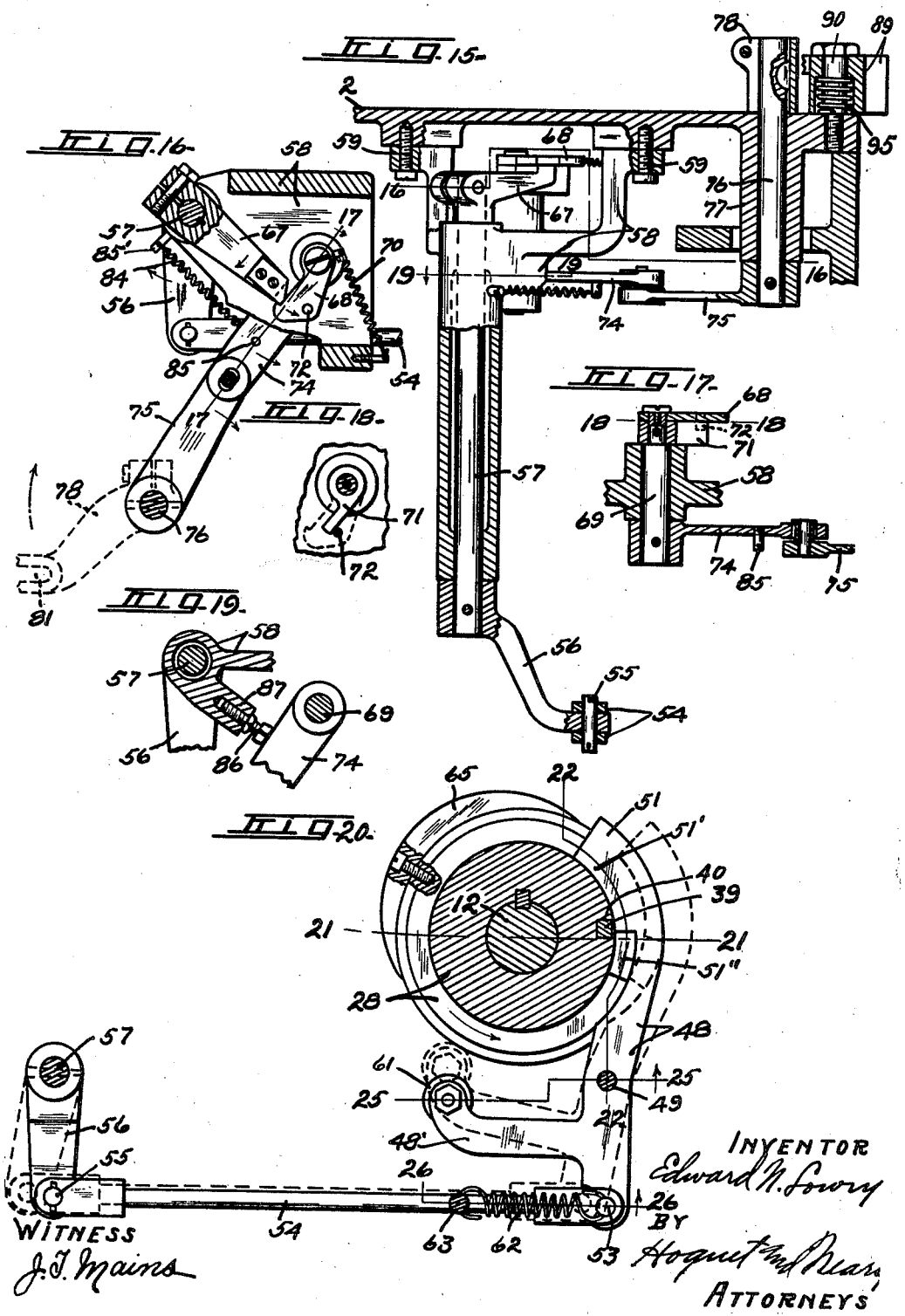

May 24, 1938.  E. N. LOWRY  2,118,710
BOTTLE CAPPING MACHINE
Filed Aug. 22, 1934  17 Sheets-Sheet 7
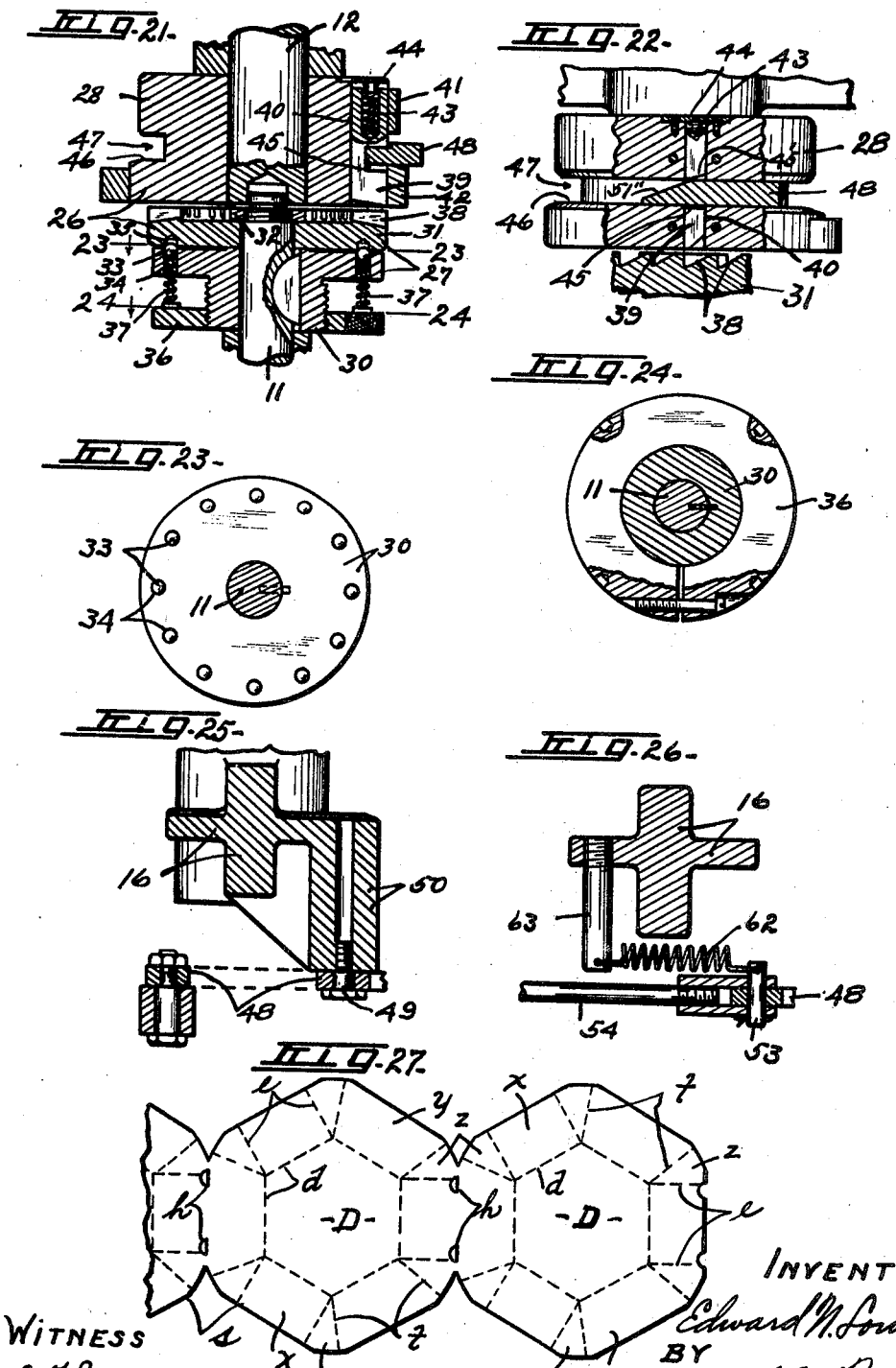

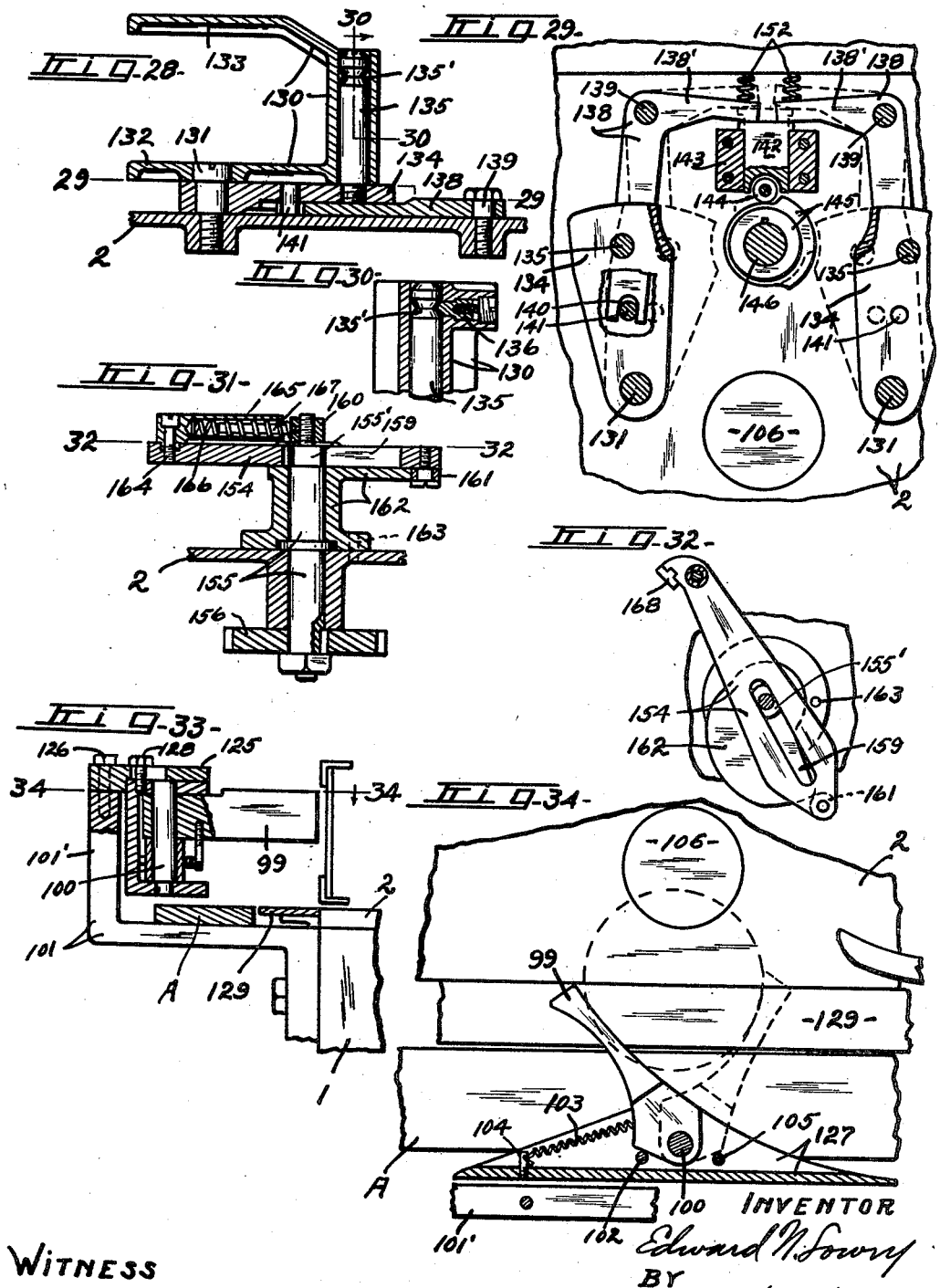

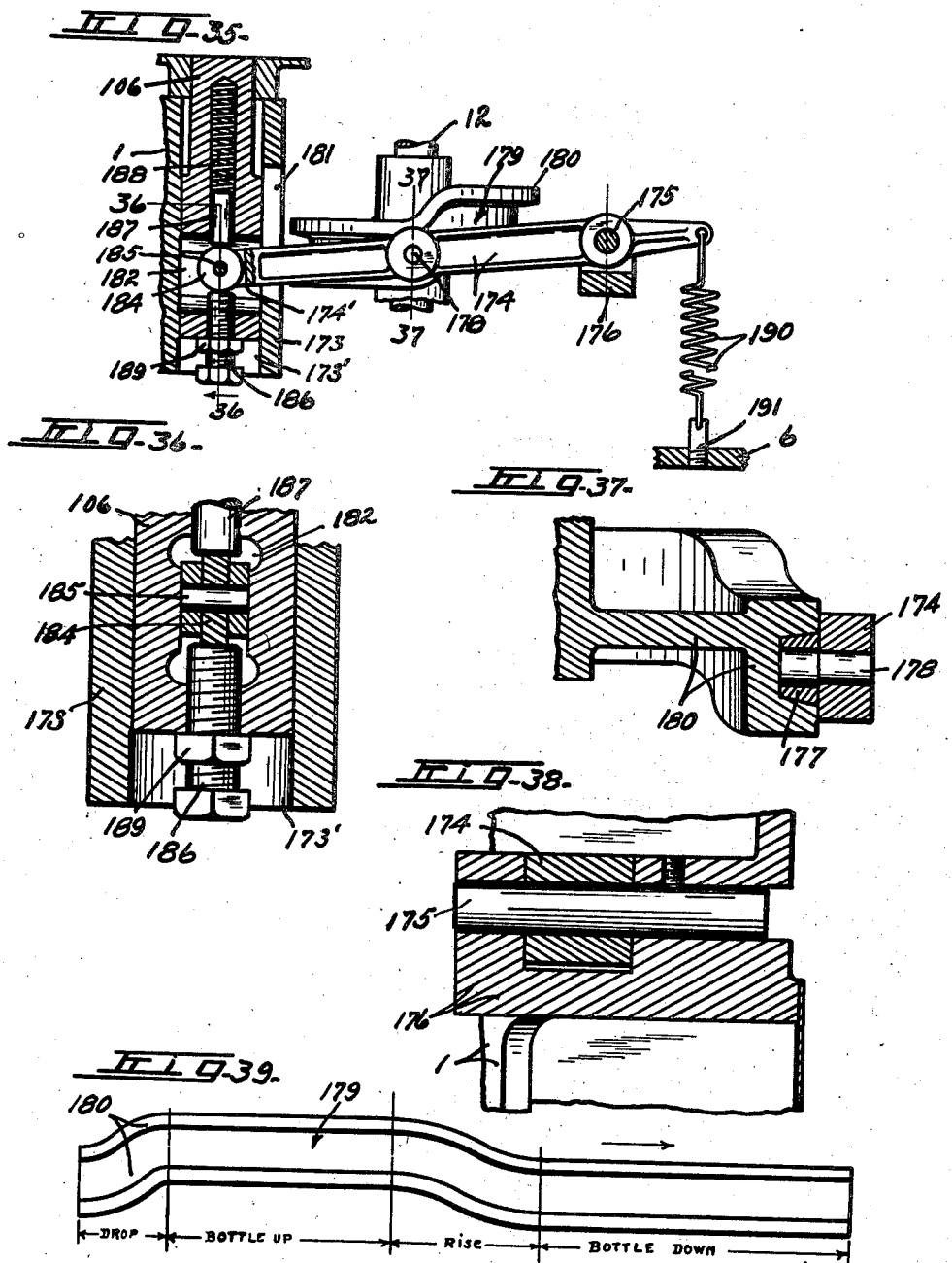

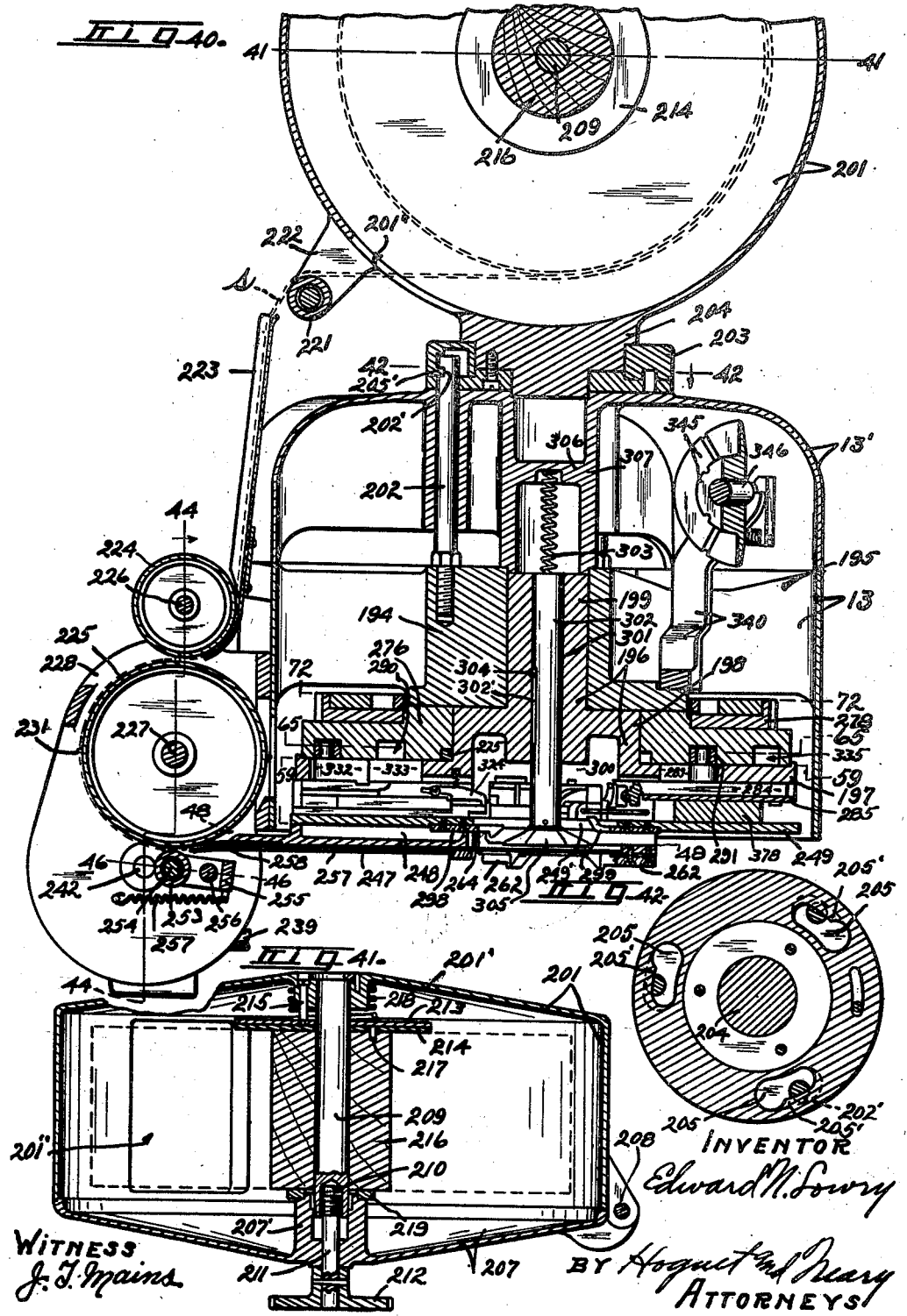

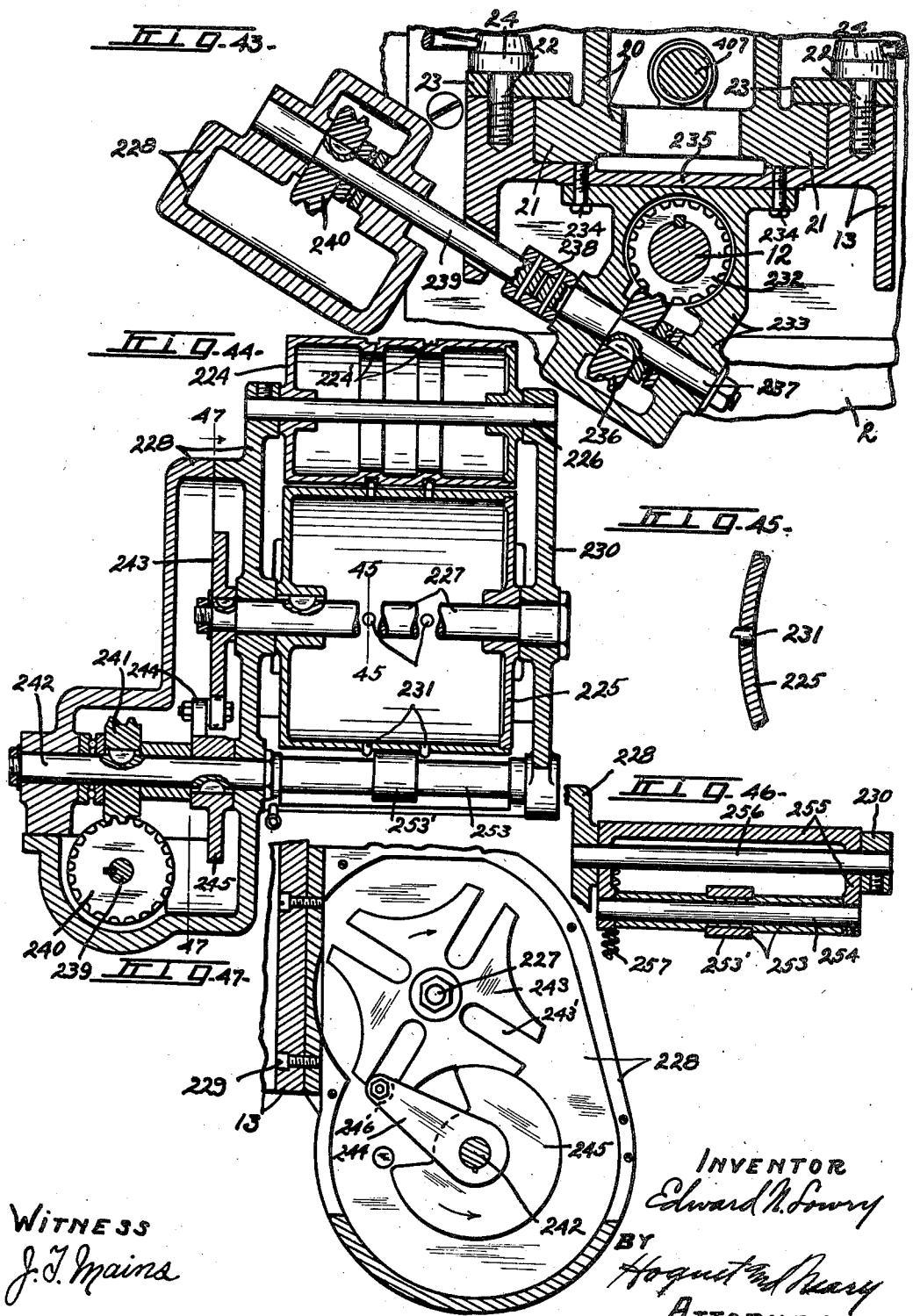

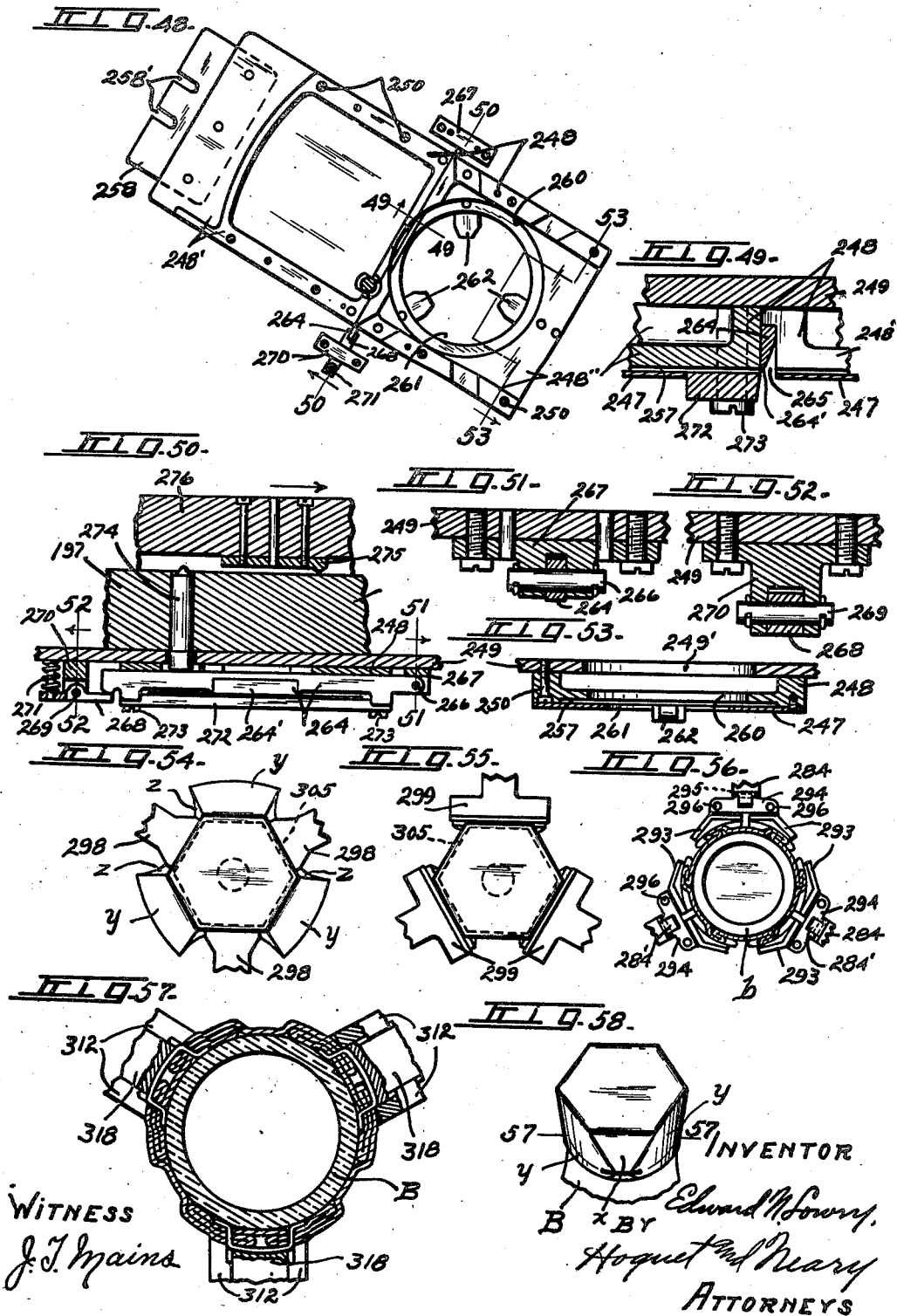

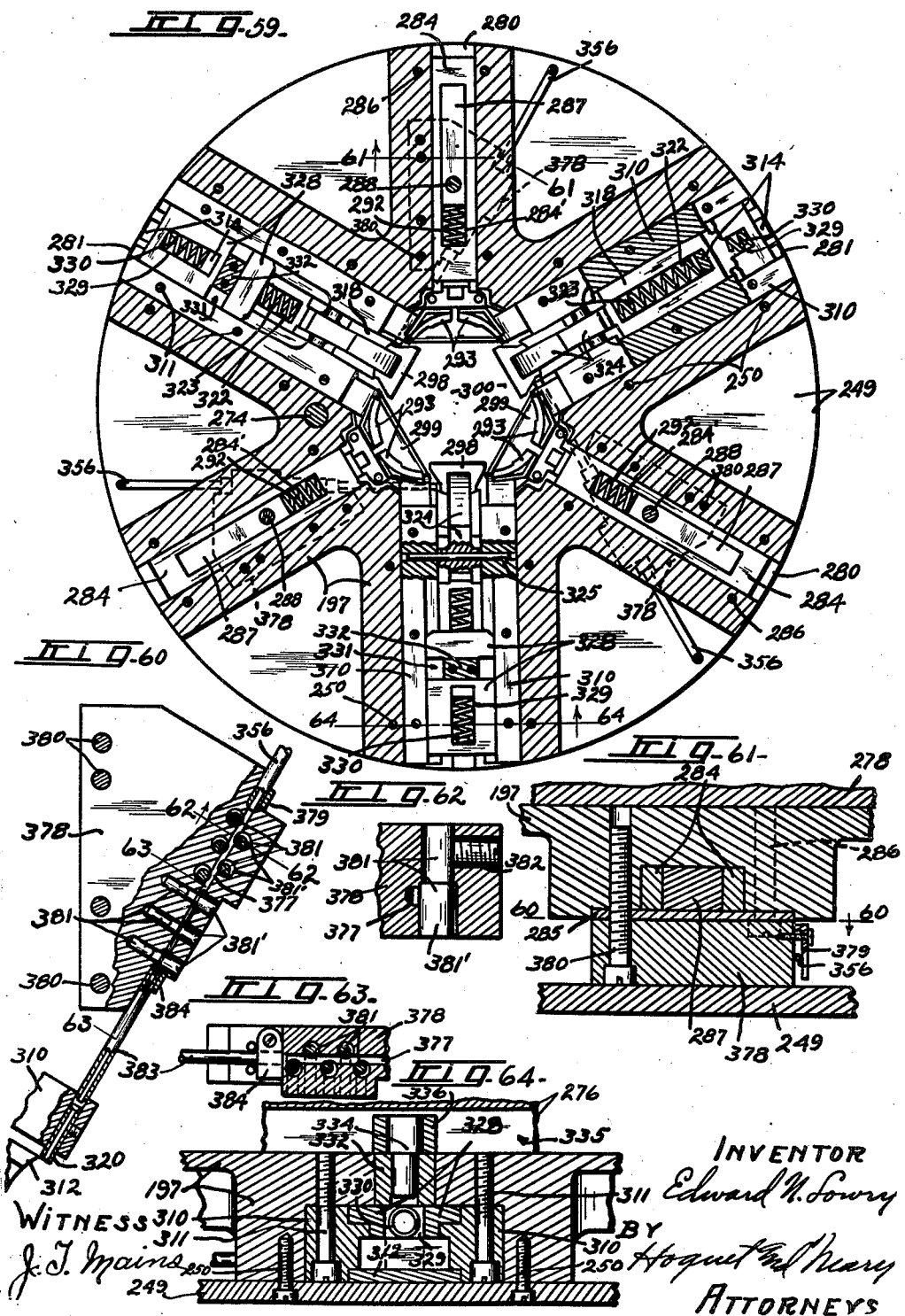

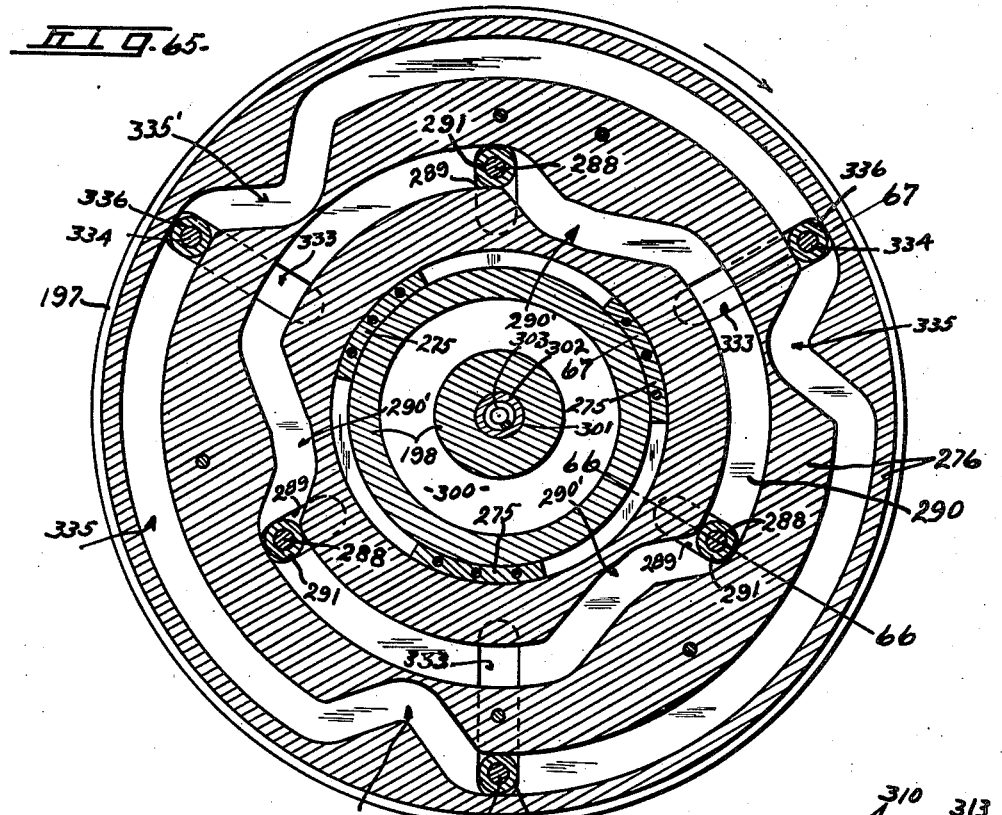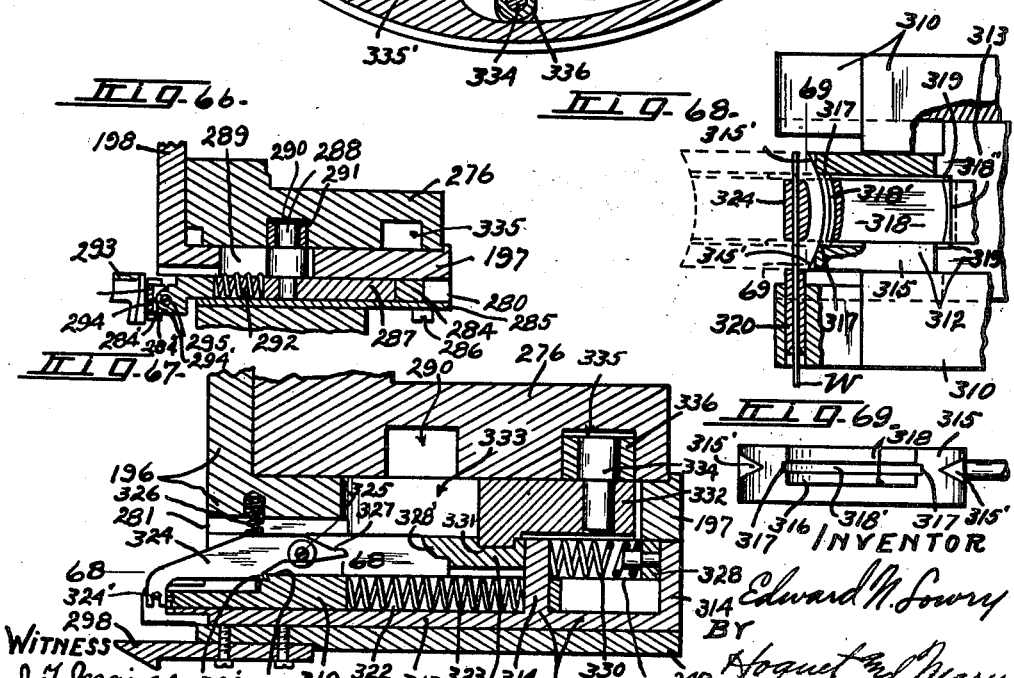

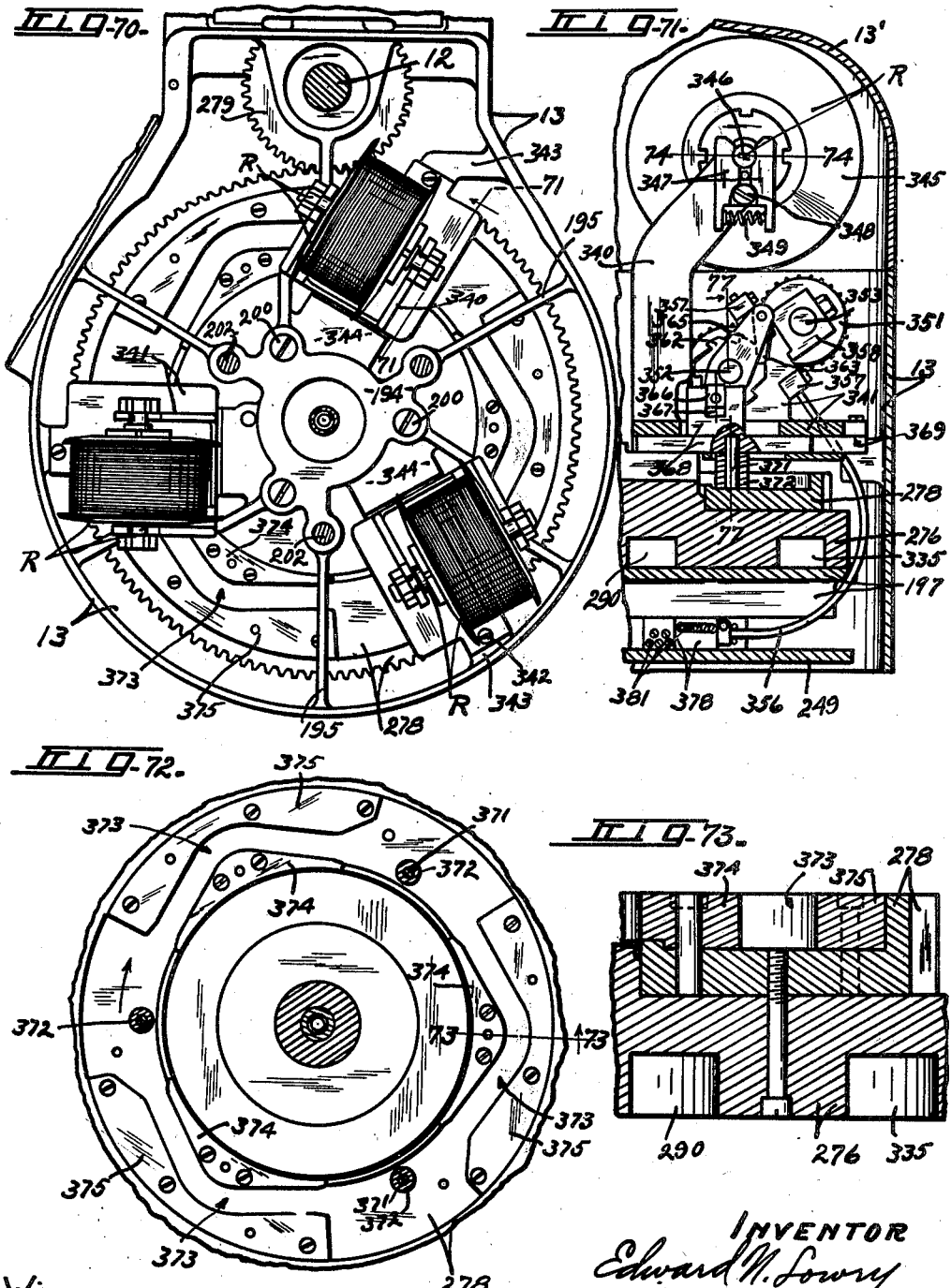

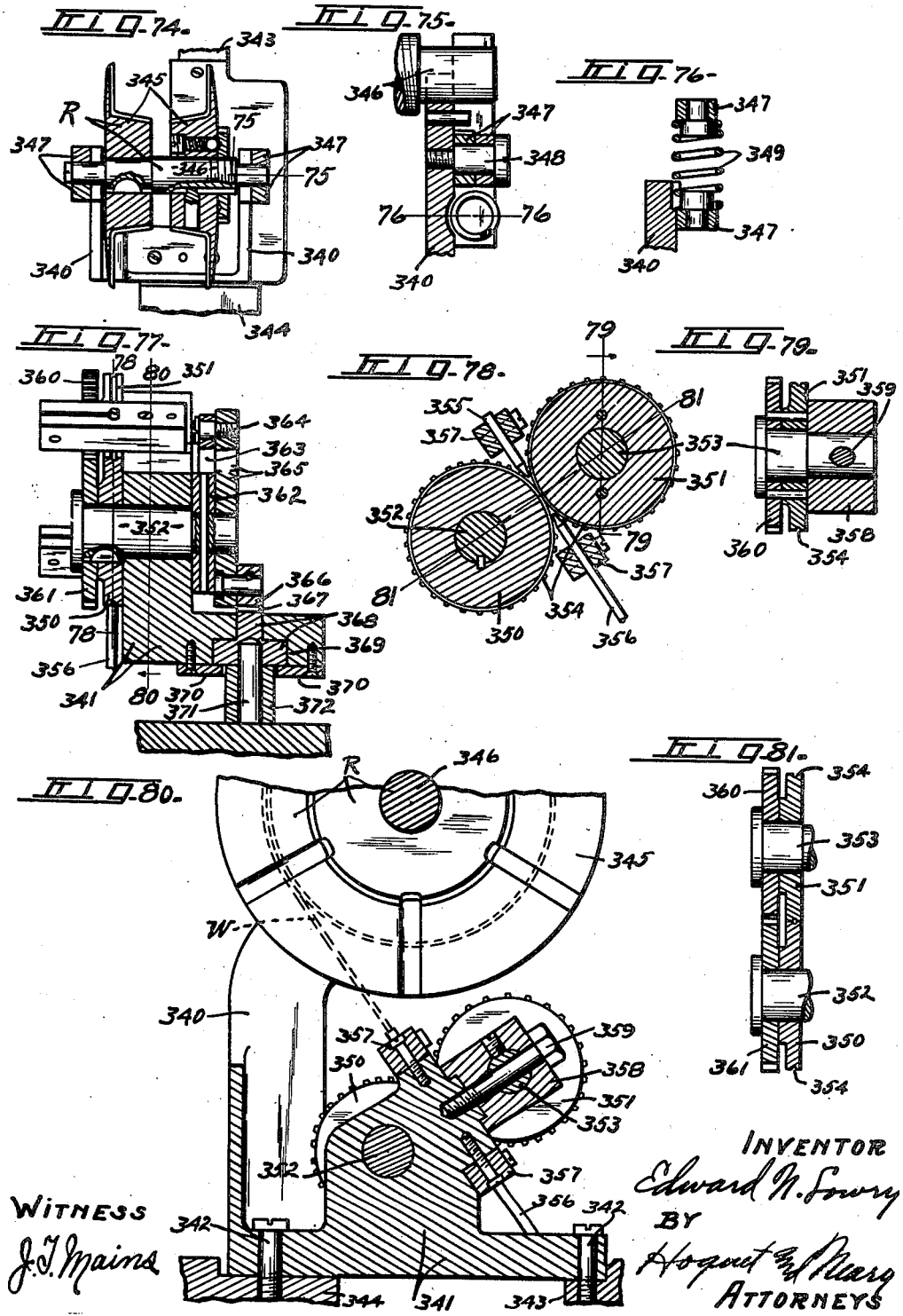

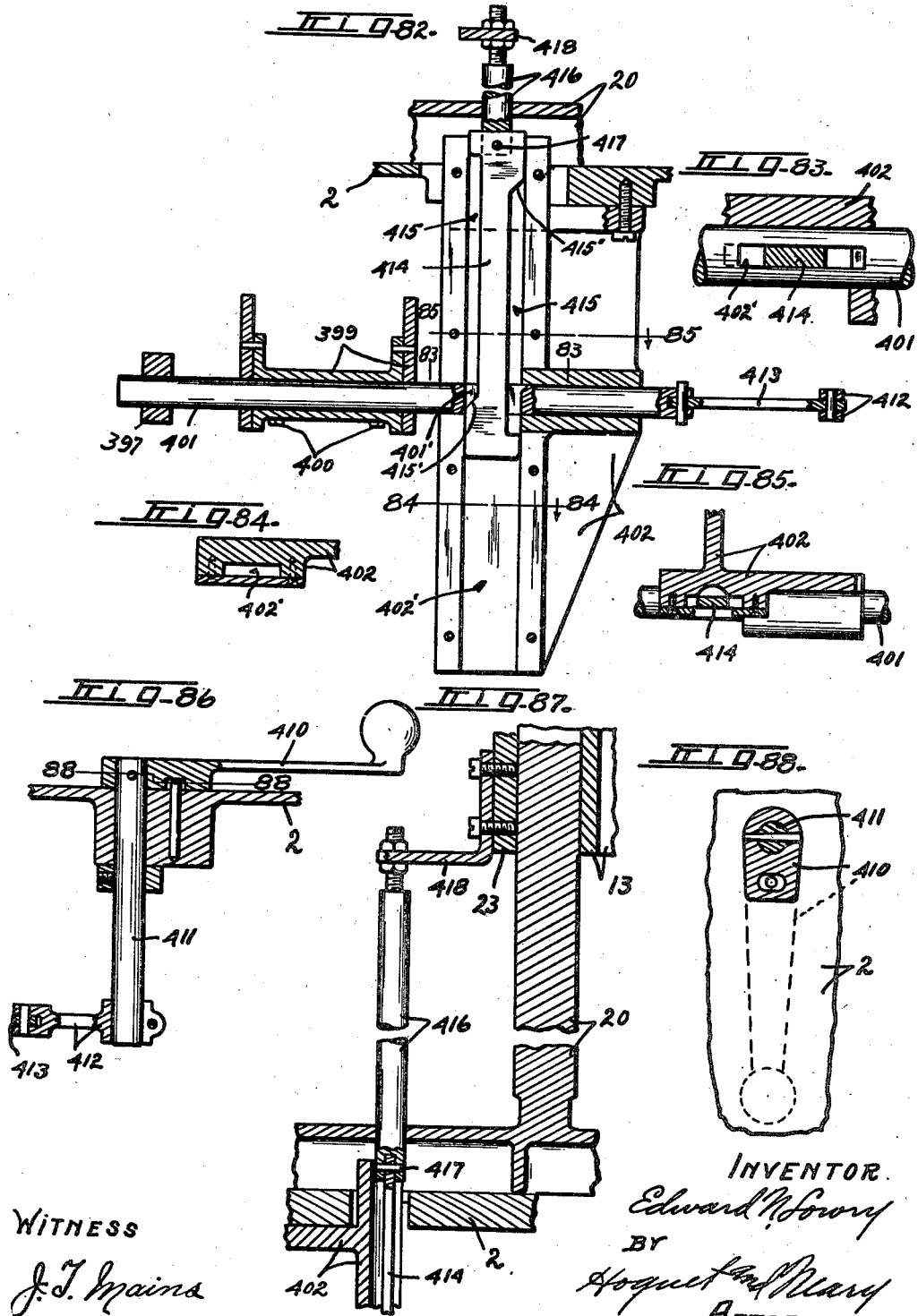

Patented May 24, 1938

2,118,710

UNITED STATES PATENT OFFICE 2,118,710

BOTTLE CAPPING MACHINE

Edward N. Lowry, Syracuse, N. Y., assignor, by mesne assignments, to William L. Broad, Syracuse, N. Y.

Application August 22, 1934, Serial No. 740,946

28 Claims. (Cl. 226—83)

This invention relates to bottle capping machines and is an improvement over that forming the subject-matter of a co-pending application filed August 6, 1931, by Joseph F. Mitchell, Serial No. 555,458.

In bottle-capping machines constructed after the manner disclosed in the above-mentioned application, Serial No. 555,458 to Joseph F. Mitchell, as well as in other machines constructed for applying cap blanks composed of paper or similar material and which are of sufficient area to cover the head and extend around the neck of the bottles, it has been found that the caps were not always properly secured on the bottles due to the failure of accurately feeding and positioning the cap blanks over the heads of the bottles.

The general object of this invention is to provide improved means for applying cover-all caps over the mouth and about the neck of milk bottles or the like for maintaining the mouth of the bottles in a sanitary wholesome condition.

One of the specific objects of the invention is to provide a new and improved mechanism for feeding cap blanks having a greater area than that of the mouth of the bottle to be capped over said bottle in concentric relation with the mouth thereof.

Another object is to provide a cap-forming and stapling mechanism for a bottle-capping machine of the above-mentioned class which is simpler and more durable in construction than those heretofore employed.

Still another object is to provide means for securing the folded portion of the cap blank in position on the bottle which is accurate, positive and dependable in operation and which is economical and durable in construction.

A further object is to provide a bottle-capping machine with an improved mechanism for moving bottles to be capped from a conventional bottle-conveying apparatus into operative relation with the cap-forming and applying mechanism of the capping machine and for returning said bottles to the conveyor after the capping operation has been completed.

A still further object is to provide a simple, durable and efficacious means whereby the cap-applying mechanism may be readily adjusted for capping bottles of different heights.

Still another specific object is to provide a bottle-capping mechanism wherein substantially all of the various moving intricate parts of the apparatus will be encased so as to prevent such parts from being brought into contact with and contaminated by any fluid being carried by the bottles which may accidentally be spilt from said bottles during the capping operation and also from the washing fluid used in cleaning exposed portions of the machine after the capping operation has been completed.

Other objects and advantages relating to the structure of the apparatus and the form and relation of the parts thereof, will more fully appear from the following description taken in connection with the accompanying drawings in which:—

Figure 2 is a plan view of the device illustrated in Figure 1.

Figure 3 is a fragmentary horizontal sectional view through one side of the base, taken substantially in the plane of the line 3—3, Figure 5.

Figure 4 is an enlarged sectional view taken on line 4—4, Figure 3.

Figure 5 is an enlarged vertical central sectional view taken on line 5—5, Figure 1.

Figure 6 is a horizontal sectional view through the upper portion of the base taken substantially in the plane of the line 6—6, Figure 5.

Figure 7 is an enlarged detail vertical sectional view taken on line 7—7, Figure 6.

Figure 8 is a sectional view taken on line 8—8, Figure 7.

Figure 9 is a sectional view taken on line 9—9, Figure 6.

Figure 10 is an enlarged fragmentary horizontal sectional view illustrating the bottle feed and positioning means in plan view taken in the plane of the line 10—10, Figure 1.

Figure 1:
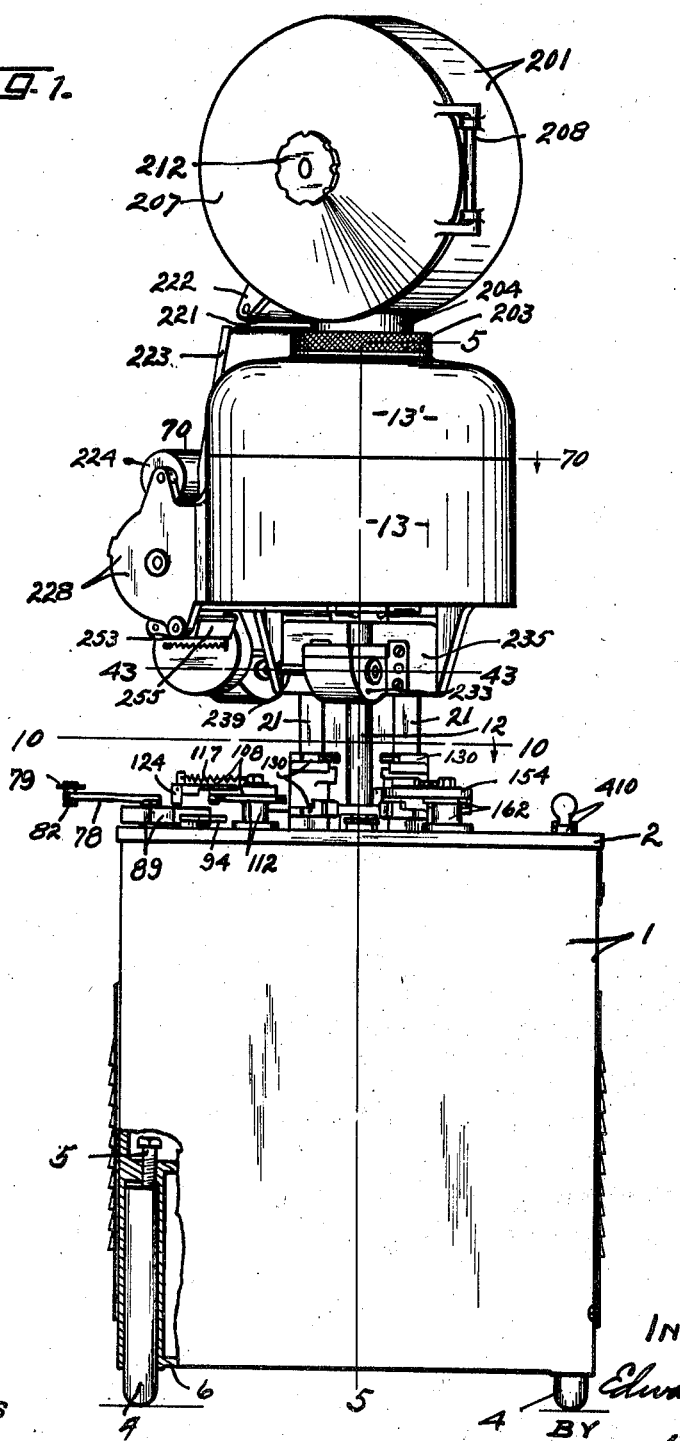
Figure 1 is a front elevation, partly in section, of a bottle-capping machine embodying the various features of this invention.

Figures 11, 12 and 13 are detail enlarged vertical sectional views taken respectively on lines 11—11, 12—12 and 13—13, Figure 10.

Figure 14 is a sectional view taken on line 14—14, Figure 13.

Figure 15 is an enlarged detail vertical sectional view through the clutch control arm taken on line 15—15, Figure 10.

Figure 16 is a horizontal sectional view taken substantially in the plane of the line 16—16, Figure 15.

Figure 17 is a detail sectional view taken on line 17—17, Figure 16.

Figure 18 is a sectional view taken on line 18—18, Figure 17.

Figure 19 is a sectional view taken on line 19—19, Figure 15.

Figure 20 is an enlarged horizontal sectional view through the drive clutch taken on line 20—20, Figure 5.

Figures 21 and 22 are detail vertical sectional views taken respectively on lines 21—21 and 22—22, Figure 20.

Figures 23 and 24 are horizontal sectional views taken respectively on lines 23—23 and 24—24, Figure 21.

Figures 25 and 26 are enlarged detail sectional views taken respectively on lines 25—25 and 26—26, Figure 20.

Figure 27 is a plan view of a portion of a strip of cap blanks illustrating the blanks in the form in which they are fed over the mouth of the bottle.

Figure 28 is an enlarged detail vertical sectional view through one of the bottle-positioning means taken on line 28—28, Figure 10.

Figure 29 is a horizontal sectional view of the bottle-positioning means taken in the plane of the line 29—29, Figure 28.

Figure 30 is a detail sectional view taken on line 30—30, Figure 28.

Figure 31 is an enlarged detail vertical sectional view of the bottle-removing arm taken on line 31—31, Figure 10.

Figure 32 is a horizontal sectional view taken on line 32—32, Figure 31.

Figure 33 is an enlarged detail vertical sectional view through the bottle guide and an adjacent portion of the bottle conveyor taken in the plane of the line 33—33, Figure 10.

Figure 34 is a fragmentary horizontal sectional view taken on line 34—34, Figure 33.

Figure 35 is a detail vertical sectional view illustrating the bottle-lifting means, taken on line 35—35, Figure 6.

Figures 36 and 37 are enlarged detail sectional views taken respectively on lines 36—36 and 37—37, Figure 35.

Figure 38 is an enlarged sectional view taken on line 38—38, Figure 6.

Figure 39 is a diagrammatic view illustrating the development of the cam for actuating the bottle-lifting plunger.

Figure 40 is an enlarged vertical sectional view through the cap-forming and securing means and the lower portion of the cap blank coil case taken in the plane of the line 40—40, Figure 2.

Figure 41 is a horizontal sectional view through the coil case taken on line 41—41, Figure 40.

Figure 42 is a horizontal sectional view illustrating the manner in which the coil case is secured to the case for the cap-forming and securing means.

Figure 43 is an enlarged detail horizontal sectional view through the drive means for the cap blank feed mechanism, taken on line 43—43, Figure 1.

Figure 44 is an enlarged vertical sectional view through the cap blank feed means taken in the plane of the line 44—44, Figure 40.

Figure 45 is a detail sectional view taken on line 45—45, Figure 44.

Figure 46 is a detail horizontal sectional view taken on line 46—46, Figure 40.

Figure 47 is a vertical sectional view taken on line 47—47, Figure 44.

Figure 48 is a detail horizontal sectional view illustrating the cap blank guide plate in plan view taken substantially on line 48—48, Figure 40.

Figures 49 and 50 are enlarged detail vertical sectional views illustrating the means for severing one cap blank from another taken respectively on lines 49—49 and 50—50, Figure 48.

Figures 51 and 52 are detail sectional views taken respectively on lines 51—51 and 52—52, Figure 50.

Figure 53 is a detail vertical sectional view taken in the plane of the line 53—53, Figure 48.

Figures 54 and 55 are plan views of a cap blank and adjacent end portions of the cap-forming fingers illustrating the manner in which the skirt of the cap is formed into plaits about the head and neck of the bottle.

Figure 56 is a detail sectional view of the upper portion of the cap blank, with the bottle and plait-folding fingers in plan view illustrating the manner in which the plaits are folded about the head of the bottle.

Figure 57 is a sectional view taken on line 57—57, Figure 58, in the plane of the staples, with the adjacent ends of the staple-forming and driving means illustrated in operative relation therewith.

Figure 58 is a perspective view of the upper end of a bottle, with a skirted cap secured thereto.

Figure 59 is an enlarged horizontal sectional view taken on line 59—59, Figure 40, illustrating the securing means and the cap plait folding means in plan view.

Figure 60 is a detail horizontal sectional view through the staple wire guide and straightening means, taken in the plane of the line 60—60, Figure 61.

Figure 61 is an enlarged detail vertical sectional view taken on line 61—61, Figure 59.

Figures 62 and 63 are detail sectional views taken respectively on lines 62—62 and 63—63, Figure 60.

Figure 64 is an enlarged detail transverse sectional view of the stapling mechanism, taken on line 64—64, Figure 59.

Figure 65 is an enlarged horizontal sectional view through the skirt-folding finger-operating cam and the staple-forming and driving operating cam, taken in the plane of the line 65—65, Figure 40.

Figures 66 and 67 are enlarged detail vertical sectional views taken respectively on lines 66—66 and 67—67, Figure 65.

Figure 68 is a detail horizontal sectional view taken in the plane of the line 68—68, Figure 67.

Figure 69 is a vertical end view of the staple-forming and driving means, taken in the plane of the line 69—69, Figure 68.

Figure 70 is a top plan of the case for the cap-forming and applying mechanism, with the case cap removed illustrating the staple wire reels and adjacent portion of the wire feed mechanism in plan view.

Figure 71 is an enlarged detail vertical sectional view taken in the plane of the line 71—71, Figure 70.

Figure 72 is a detail horizontal sectional view illustrating the cam for operating the wire feed mechanism in plan view, taken on line 72—72, Figure 40.

Figure 73 is an enlarged detail sectional view taken on line 73—73, Figure 72.

Figure 74 is a horizontal sectional view through one of the staple wire reels and the supporting means therefor taken on line 74—74, Figure 71.

Figure 75 is a detail sectional view taken on line 75—75, Figure 74.

Figure 76 is a sectional view taken on line 76—76, Figure 75.

Figure 77 is an enlarged vertical sectional view taken on line 77—77, Figure 71.

Figure 78 is a section taken on line 78—78, Figure 77.

Figure 79 is a section taken on line 79—79, Figure 78.

Figure 80 is an enlarged sectional view taken on line 80—80, Figure 77.

Figure 81 is a sectional view taken on line 81—81, Figure 78.

Figure 82 is an enlarged vertical sectional view taken in the plane of the line 82—82, Figure 6, illustrating the manner of automatically controlling the operation of the means for elevating and lowering the cap-forming and applying mechanism so as to cap bottles of different heights.

Figures 83, 84 and 85 are detail sectional views taken respectively on lines 83—83, 84—84 and 85—85, Figure 82.

Figure 86 is an enlarged detail vertical sectional view through the elevating control arm on line 86—86, Figure 2.

Figure 87 is an enlarged detail vertical sectional view taken on line 87—87, Figure 2.

Figure 88 is a horizontal sectional view taken in the plane of the line 88—88, Figure 86.

The apparatus comprising this invention is adapted to automatically apply cap blanks of substantially the same form and class as those shown and described in the hereinbefore-mentioned co-pending application of J. F. Mitchell, Serial No. 555,458 except that the blanks are attached to form a long continuous strip which is arranged in a coil upon a core; said blanks are fed in sequential order over the mouth of the bottles to be capped between the bottles and the cap-forming and applying mechanism.

The machine, as shown, is constructed to cap one bottle at a time and is adapted to be placed at any convenient location adjacent to and in co-operative relation with the usual conveyor used in transporting filled bottles from a conventional capping machine to receive the bottles from said conveyor, and after applying the skirted caps thereto, to return the bottles to the conveyor or other suitable conveyor preparatory to crating and shipping the bottles.

The machine comprises a box-like base 1 having the upper end thereof enclosed by a bed-plate 2 secured to the base 1 by screws 3. The base 1 is adapted to encase the major portion of the drive mechanism for the machine and is mounted upon four posts or legs 4 which are slidably mounted in respective sockets provided in the lower portion of the base, and the base may be adjusted vertically relative to the legs 4 by means of adjusting screws 5 for the purpose of bringing the upper surface of the bed-plate 2 into co-operative relation with the usual bottle conveyor which is indicated by broken lines as at A, Figure 10, and by full lines in Figures 33 and 34.

To the bottom 6 of the base 1 and positioned at one side of the center of said base, is a drive motor 7 which has the armature shaft thereof operably connected with a speed-reducing gearing illustrated in Figure 3 as a worm 8 and worm gear 9 mounted in a case 10 secured to or made integral with the case of the motor 7. The drive shaft 11 of the speed-reducing gearing extends upwardly in a vertical plane from the case 10 in coaxial alignment with a vertically disposed drive shaft 12 adapted to operate the various operating units of the device. The drive shaft 12 extends from a relatively short distance above the upper end of the shaft 11 upwardly through the base 1 and bed-plate 2, with the upper end thereof terminating some distance above the bed-plate 3 within a cylindrical case 13 adapted to contain the cap-forming and securing mechanism, which will hereinafter be more fully explained.

The shaft 12 is journaled within the bed-plate at 14 and near its lower end in a suitable bearing 15 provided in a rib 16 which extends across the interior of the base 1 intermediate the upper and lower ends thereof. The upper end of the shaft 12 is journaled in a pair of vertically spaced bearing members 17 and 18 provided in one side of the case 13.

An upwardly extending bracket 20 is mounted on the bed-plate 2 for supporting the case 13 and for this purpose, is provided with a pair of vertically disposed guide flanges 21 provided in the front face of the bracket 20 at the rear of the shaft 12. The case 13 is releasably clamped to the guide flanges 21, as shown in Figures 2 and 43, by bolts 22 screw-threaded in the case 13 and which extend through respective holes provided in gibs 23. The outer ends of the screws 22 are provided with nuts 24 adapted to engage the gibs 23 for bringing said gibs into and out of frictional engagement with the respective guide flanges 21.

The drive shaft 12 is releasably connected with the shaft 11 of the speed-reducing gearing by means of a clutch mechanism 26 secured to adjacent ends of said shafts. The clutch 26, as illustrated more clearly in Figure 5 and Figures 20 to 24 inclusive, consists of a drive section 27 secured to the shaft 11 and a driven section 28 secured to the shaft 12. The drive section 27 consists of a flanged hub 30 which is secured by a key or other means to the shaft 11 and a drive disk 31 rotatably mounted upon the upper end of the shaft 11 between the hub member 30 and a nut 32 screw-threaded on the upper end of the shaft 11.

The disk 31 is frictionally driven by the hub member 30 by means of a plurality of, in this instance twelve, spring-pressed balls 33 mounted in apertures 34 provided in the flange of the hub 30 in normal registration with companion apertures 35 provided in the drive disk 31. The extent to which the balls 33 are positioned in the apertures 35, is determined by a nut 36 screw-threaded on the lower end of the hub member 30 in engagement with the ball springs as 37, so that the disk 31 will be driven by the hub member 30 through the medium of the balls 33 with a greater or less degree of friction, depending upon the tension of the springs and the degree to which the balls 33 are maintained within the apertures 35.

The upper face of the drive disk 31 is serrated to form ratchet teeth 38 formed with the upper faces thereof beveled for the purpose of driving the clutch section 28 in one direction only. The driven section 28 is releasably connected with the drive disk 31 by means of a latch member 39 slidably mounted in a vertically disposed slot 40 provided in the periphery of the driven clutch section 28. The clutch latch 39 is held in the slot against lateral displacement by means of a pair of guide plates 41 and 42 secured to the periphery of the clutch section 13 in any suitable manner. The lower end of the latch 39 is beveled to conform to the contour of the face of the teeth 38 with which the latch is normally yieldingly held in engagement by a coil spring 43 positioned in a vertically disposed hole formed in the upper end of the latch 39, with the upper end of the spring contacting with a spring-retaining plate 44 secured by screws or other means to the upper face of the clutch section 28. The outer vertical edge of the latch 39 is provided with a transverse slot 45 which has the upper wall 45' thereof slightly beveled upwardly and forwardly, with the rear lower edge of said beveled wall registering when in the clutch position, with the lower wall 46 of an annular groove 47 formed in the periphery of the drive clutch section 28 intermediate the adjacent sides of the guide plates 41 and 42.

The groove 47 is of substantially the same depth as the slot 45 in the latch 39 and is adapted to receive therein, one end of a latch release lever 48 which is pivotally connected at 49 with a boss 50 provided integral with the rib 16, as shown more clearly in Figure 25. One end 51 of the latch release lever is adapted to travel in the groove 47 and has the inner edge thereof provided with an inwardly projecting flange 51' of substantially the same width as said groove and which has the inner vertical edge thereof slightly concaved to conform to and engage the inner vertical wall of the groove 47 when in the operative position in said groove.

The forward end of the flange 51' is beveled to form a cam 51'' for engaging the tapered wall 45' of the slot 45 for lifting the latch 39 against the action of the spring 43 for bringing the latch out of engagement with the teeth 38 of the drive disk 31, as illustrated in Figure 22, for disengaging the clutch sections.

The outer end of the clutch release lever 48 extends a short distance beyond the pivot 49 and is pivotally connected by a pin 53 to one end of a horizontally disposed connecting rod 54 which has its other end pivotally connected at 55 to the free end of a rock arm 56 which is secured to the lower end of a vertically disposed rock shaft 57 journaled in suitable bearings provided in a bracket 58 secured by screws 59 to the lower face of the bed-plate 2 adjacent one side of the base 1, as illustrated more clearly in Figures 6 and 15, for a purpose which will presently be more fully explained.

Intermediate the pivot 49 and the outer end of the lever 48, is an integral forwardly extending arm 48' which has the outer end thereof provided with a roller 61 adapted to contact with the peripheral wall of the driven cam section 28 for limiting the outward movement of the latch-engaging end 51 of the latch release lever 48. The roller 61 is yieldingly maintained in contact with the clutch section 28 by a tension spring 62 connected at one end to the pin 53 and at the other end to a stud 63 secured to the rib 16.

A cam segment 65 is secured to or made integral with the periphery of the clutch section 28 and positioned at one side of the groove 47 in the plane of travel of the roller 61 and is adapted to engage said roller to rock the lever 48 about its pivot 49 against the action of the spring 62 for the purpose of restoring the end 51 to its normal operative position within the groove 47 during a portion of a revolution of the clutch section 28 after the arm 48 has been moved by the action of the spring 62 to the inoperative position, as indicated by broken lines in Figure 20 when released by the action of a bottle in the following manner:

As illustrated in Figures 15 and 16, the upper end of the hereinbefore-mentioned rock shaft 57 terminates beneath the bed-plate 2 and has secured thereto a rock arm 67 which has its free end releasably engaged by a latch 68 pivotally mounted upon the upper end of a stud 69 journaled in the bracket 58 and adapted to releasably maintain the latch release lever 48 in the operative position against the action of the spring 62. The latch 68 is yieldingly maintained in engagement with the arm 67 by means of a spring 70 having one end secured to the latch and the other end secured to an adjacent portion of the bracket 58, as illustrated in Figure 16.

The latch 68 is adapted to be moved out of engagement with the arm 67 by means of a dog 71 secured to the shaft 69 in position to engage a pendent pin 72 secured to the latch 68 as illustrated in Figures 17 and 18.

The shaft 69 extends below the bracket 58 and has secured to the lower end thereof a rock arm 74 which has a slot and pin connection with the free end of a second rock arm 75 secured to the lower end of a vertically disposed rock shaft 76 which is journaled in a bearing 77 provided on the lower face of the bed-plate 2. The shaft 76 extends upwardly through the bed-plate 2 and has secured to the upper end thereof a trip arm 78 which has the free end thereof extended outwardly beyond the bed-plate 2 so as to be in close relation with the bottle conveyor as A, Figure 10, and is provided with a roller 79 adapted to be engaged by a bottle B indicated by broken lines in Figure 10 as said bottle is carried forward by the conveyor for the purpose of actuating said trip arm and shaft 76 for the purpose of moving the catch 68 out of engagement with the arm 67 and thereby permit the spring 62 to move the latch release lever from the operative position in engagement with the latch 39 to the inoperative position for permitting said latch to be moved into engagement with the teeth 38 on the disk 31 for connecting the clutch section 28 with the drive clutch section 27.

The roller as 79 is adjustably mounted by means of a stud 80 passing through an elongated slot 81 in the outer end of the trip arm 78 and clamped to said arm in any suitable manner as by a nut 82 screw-threaded on the lower end of the stud 80 so that the roller will be engaged by a bottle on the conveyor A at such a time that the clutch release lever 48 will be maintained in the outermost inoperative position as the latch 39 is passing the flanged portion 51' of the lever, thereby permitting the machine to operate continuously as long as bottles are continuously fed by the conveyor in position to be received by the capping machine. As soon, nowever, as the line of bottles being carried by the conveyor A to the machine is discontinued or broken, the trip arm will be permitted to remain in its outermost position and thereby permit the catch 68 to hold the latch release lever 48 in its operative position with the cam 51' in the path of travel of the latch 39 by the engagement of the catch with the arm 67 and thus disconnect the shaft 11 with the drive shaft 12 and permit the shaft 12 and the mechanism driven thereby to come to an at-rest position.

The trip arm 78 is yieldingly maintained in its outermost operative position so that the roller 79 will be in the path of movement of the bottles upon the conveyor A by means of a spring 84 connected at one end with a stud 85 secured to the arm 74 near its outer end and the other end of the spring is secured by a stud 85' to the bracket 58. The spring 84 normally maintains the arms 74 in contact with a stop screw 86 screw-threaded in a boss 87 provided on the bracket 58, as illustrated in Figure 19. The screw 86 is adjusted so that when the lever 74 is in engagement therewith, the dog 71 will maintain the catch 68 in position to engage the outer end of the arm 67 when said arm is returned to its normal position by the action of the cam 65 on the clutch member 28 upon the roller 61 on the latch release lever 48.

*Bottle feed*

As the bottles leave the roller 79, they are brought by the conveyor A into contact with a bottle-holding and release arm 89 which is pivoted intermediate its ends upon a shouldered stud 90 secured to the bed-plate 2, as indicated more clearly in Figures 10 and 11. This arm 89 is provided with an extension 91 in one side thereof normally positioned in the path of movement of the bottles B and is provided with an arcuate surface 91' conforming in contour to that of the bottle and adapted to be engaged by the bottle when the arm is in its normal position. The forward end of the arm is provided with a roller 92 secured to the underside thereof by means of a shouldered stud 93. This roller 92 is yieldingly held in contact with the peripheral surface of a cam 94 by means of a tension spring 95 coiled about the stud 90 and positioned within an enlarged recess provided in the underside of the arm 89.

The cam 94 is secured to the upper end of a short shaft 96 which is journaled in the bed-plate 2 and extends a short distance below said bed-plate and has secured to the lower end thereof a spur gear 97 adapted to be driven through the medium of a train of gears operated by the drive shaft 12 in the manner hereinafter more fully described.

The cam 94 is so constructed that soon after it begins its cycle of operation, the forward portion of the arm will be permitted to be moved inwardly by the action of the spring 95 sufficiently to bring the extension 91 out of the path of movement of the bottle B thereby permitting said bottle to be moved forwardly by the conveyor A. At the same time, the rear end as 89' of the arm will be brought into the path of movement of the succeeding bottle for maintaining said bottle in a position at the rear of that normally assumed by the extension 91 when the arm is in its normal position. As the arm is again returned to its normal position by the cam 94, the rear portion 89' thereof is moved inwardly out of the path of movement of the bottle, permitting said bottle to move forwardly until it engages the extension 91, in which position the bottle will be maintained until the arm 89 is again permitted to move inwardly by the cam 94.

After the bottle is released by the arm 89, it is brought into engagement by the conveyor A with a guide arm 99 which, as illustrated more particularly in Figures 10, 33 and 34 is pivotally mounted at one end upon a stud 100 carried by a bracket 101 secured to the upper portion of the front face of the base 1. This bracket 101 extends outwardly from the base beneath the conveyor A and is provided with an upwardly extending portion 101' which is positioned in a plane outside the conveyor and supports, through the medium of a frame 127, the stud 100 in a vertical plane adjacent the outer side of said conveyor so that the arm 99 will extend across and some distance above the conveyor in the path of movement of the bottles carried by the conveyor.

The arm 99 is yieldingly maintained in its forward position against a limiting stop 102 secured to the frame 127 by means of a spring 103 which has one end secured to the arm and the other end connected by a stud 104 to the frame 127. As the bottles are fed forwardly by a mechanism presently described, the arm 99 is rocked forwardly by said bottle until it is brought into engagement with a second limiting stop 105 also secured to the frame 127 and adapted to maintain the arm 99 in such a position, indicated by broken lines in Figure 34, that it will co-operate with the bottle feed means for guiding the bottle over the upper end of a bottle actuating plunger 106, hereinafter more clearly described.

The hereinbefore-mentioned means for moving the bottles from the conveyor A onto the plunger 106, consists of a feed arm 108 slidably mounted upon the upper end of a vertically disposed shaft 109 some distance above the bed-plate 2. This shaft 109 extends downwardly through the bed-plate and is journaled in a bearing 110 provided on the bed-plate, and has secured to the lower end thereof, a spur gear 111 which is adapted to be driven by a train of gears actuated by the drive shaft 12 in a manner hereinafter more fully described.

Positioned upon the shaft 109 intermediate the arm 108 and the bed-plate 2, is a cam member 112 which is maintained in a fixed position by a pin 113 which is secured to the base portion of the cam member and extends into a suitable aperture provided in the bed-plate 2. The arm 108, in this instance, consists of two members 108' and 108" pivotally secured together by means of a screw 114. The arm member 108' is provided with an elongated slot 115 which is adapted to slidably receive the upper flattened end 109' of the shaft 109. The outer end of the arm member 108' has secured thereto a roller 116 which is maintained in engagement with the peripheral surface of the cam 112 by a spring 117 secured at one end to a nut 118 screw-threaded on the reduced upper end of the shaft 109 and has the other end thereof secured to a stud 120 secured in the outer end of the arm member 108".

The arm member 108" is adjustably held in fixed relation with the arm member 108' by means of a pawl 121 pivotally mounted at 122 upon the arm member 108' and engaging one of a plurality of teeth 123 provided on a curved edge of the arm member 108" formed concentric with the pivot 114, as shown more clearly in Figure 10. The pawl 121 is for the purpose of readily positioning the outer end of the arm member 108" so as to properly move bottles of various diameters from the conveyor A onto the plunger 106. The outer end of the arm member 108" may, as indicated in Figure 10, be provided with an extension tip 124 adapted to engage the body of the bottle.

In operation, the feed arm 108 is rotated by the shaft 109 and the cam 112 is such that the arm will be maintained in its extended position relative to the shaft 109 so that the outer end of the arm will engage the bottle until said bottle has been positioned upon the plunger 106, and as the bottle assumes a position substantially concentric with the plunger, the cam 112 will permit the arm 108 to be moved inwardly by the action of the spring 117 to bring the outer end of said arm out of engagement with the bottle and to permit the arm to pass between the bottle and the shaft 109 as it continues forwardly to the starting position where the arm is again brought to the outermost extended position by the cam 112, as indicated in Figure 10.

Co-operating with the feed arm 108 and the guide arm 99 for guiding the bottles in their passage from the conveyor A to the plunger 106 is a deflector plate 125 which is adjustably secured to the upper end of the bracket 101 by means of screws 126 passing through elongated slots provided in the plate 125 and screw-threaded in said bracket. This plate extends from the upper end of the bracket 101 inwardly across the plane of the conveyor A and has adjustably secured to the underside thereof the before-mentioned frame 127 by means of screws 128 which pass through elongated slots in the plate 125 and are screw-threaded in the upper portion of the frame 127. This frame 127 is a U-shaped member having the guide arm stud 100 journaled therein.

As illustrated in Figure 33, the inner vertical edges of the frame are arranged in the vertical plane of the inner edge of the plate 125 and are adapted to co-operate with the guide arm 99 in deflecting the bottles from the conveyor A.

It will be noted by referring to Figures 10, 33 and 34 that the conveyor belt is spaced some distance from the front edge of the bed-plate 2 and in order that the bottles may readily pass from the conveyor belt to the upper face of the bed-plate 2, a guide plate 129 is positioned intermediate the conveyor belt and the bed-plate and may be secured to the bed-plate or the bracket 101 in any suitable manner.

Bottle positioning means

As the bottle is brought by the feed arm 108 over the plunger 106, the bottle is engaged by a bottle positioning means which brings the bottle into substantially co-axial relation with the plunger. This bottle-positioning means consists of a pair of bottle-positioning members 130 substantially U-shaped in longitudinal cross-section and arranged substantially at the rear and one at either side of the plunger 106, as illustrated in Figures 10, 28, 29 and 30. Each of these members is pivotally mounted on the bed-plate 2 by means of a shouldered stud 131 passing through an aperture provided in the lower leg as 132 of the respective members 130.

The upper leg as 133 of the members is spaced some distance from the lower leg 132 so as to permit the free movement of the feed arm 108 and also for an ejector arm presently described, to pass between said members in the process of moving the bottle over the plunger 106 prior to the capping operation and for moving the bottle from said plunger after the cap has been applied to the bottle, as will hereinafter more readily appear.

An actuating plate as 134 is positioned between each positioning member 130 and the bed-plate 2, and each of these plates is rotatably mounted at its outer end upon the stud 131. The inner or free end of each of these plates has secured thereto an upwardly extending post 135 which extends upwardly through a vertically disposed bore formed in the transverse portion of each positioning member 130. There is a set of these positioning members employed for each size of bottle to be capped, and in order that these members may be readily removed and other members substituted therefor, it will be noted by referring to Figure 28 that the lower leg 132 merely receives the head of the respective stud 131 therein, and in order that these members may be removably secured in place, the upper end of each post 135 is provided with an annular groove 135' which is engaged by a spring-actuated plunger 136 mounted in each positioning member 130.

Each actuating plate 134 is rocked about the stud 131 as a pivot by means of a respective bell crank lever 138 each of which is pivotally secured to the bed-plate 2 by means of a shouldered stud 139. The outer end of one of the arms of each bell crank lever is forked as at 140 for receiving therein a pin 141 which is secured to the respective plate 134 intermediate the pivot 131 and the post 135. The other leg 138' of each of the bell crank levers 138 extends inwardly from the respective pivot 139 and engages the rear end of a cam slide 142 which is slidably supported in a bearing block 143 secured to the bed-plate 2.

The forward end of the cam slide 142 has rotatably mounted therein a roller 144 adapted to be engaged by a cam 145 mounted upon a vertically disposed shaft 146 which passes downwardly through and is journaled in the bed-plate 2, as illustrated more clearly in Figure 5 and has secured to the lower end thereof a spur gear 147 which is adapted to be driven by the drive shaft 12 through the medium of a spur gear 148 secured to the drive shaft in a plane immediately beneath the bed-plate 2 and an idle gear 149 rotatably mounted upon a shouldered stud 150 secured to the underside of the bed-plate.

The slide 142 and each leg 138' of the bell crank levers are yieldingly maintained in operative relation with each other and with the cam 145 by means of a pair of coiled springs 152 each of which is mounted in a respective socket provided in the front face of the bracket 20 and has the other end thereof in engagement with a respective bell crank lever leg 138'.

The forward portion of the adjacent edges of each of the legs of the positioning members 130 is provided with a concave surface 130' conforming in contour to that of the body of the bottle to be capped. These surfaces are adapted to engage opposite sides of the bottle for bringing said bottle into substantially coaxial relation with the plunger 106.

It will be noted by referring to Figures 10 and 29 that the bottle-positioning members 130 are in a position for maintaining the bottle substantially co-axial with the plunger 106 when the machine is in the at-rest position. As soon, however, as the drive shaft 12 is actuated by the engagement of the clutch 26, the cam 145 will engage the roller 144 to move the slide 142 rearwardly and thereby rock the forward ends of the bell crank levers 138 inwardly. This, in turn, will swing the rear or free ends of the plates 134 inwardly about the respective studs 131 as an axis from the position indicated by full lines in Figure 29 to that indicated by broken lines in said figure. This swinging movement of the plates 134 will produce a corresponding swinging movement of the respective positioning member 130 about the stud 131 through the medium of the corresponding posts 135. This swinging of the positioning members 130 will bring the concave faces 130' from the full line position, as indicated in Figure 10, to the position shown by dotted lines in said figure so that the outer ends of the positioning members will be spaced a maximum degree apart for the reception of a bottle therebetween as it is moved from the conveyor A to a position over the plunger 106 by the action of the feed arm 108.

As soon as the bottle has been brought to a position over the plunger 106 in the manner just described, the cam 145 is so constructed that it will release the slide 132 and permit these members to be returned to their normal position for bringing the bottle into concentric relation with the plunger 106 due to the action of the springs 152 upon the bell crank levers 138.

Bottle ejecting means

The hereinbefore-mentioned bottle-ejecting means for returning the bottle to the conveyor A after the cap has been applied thereto, consists of an ejector arm 154 slidably mounted upon the upper end of a vertically disposed shaft 155 which extends downwardly through and is journaled in the bed-plate 2 and has secured to the lower end thereof a spur gear 156 which is adapted to be rotated by the gear 147 through the medium of an idle gear 157 having meshing engagement with said gears 156 and 157 and rotatably upon a shouldered stud 158 secured to the underside of the bed-plate 2.

One end portion of the arm 154 is provided with an elongated slot 159 adapted to receive therein the flattened end portion 155' of the shaft 155 so that said arm will be driven by the shaft during the rotation thereof.

A nut 160 for maintaining the arm upon the upper end of the shaft 155 is screw-threaded upon the reduced upper end of said shaft. The outer end of the arm 154 adjacent the slot 159 has secured to the underside thereof a studded roller 161 which is adapted to engage the peripheral edge of a fixed cam member 162 mounted upon the shaft 155 intermediate the arm 154 and the bed-plate 2, said cam being maintained in a fixed position by means of a pin 163 secured to the base portion of the cam member 162 and which extends into a corresponding aperture provided in the bed-plate 2.

To the opposite end of the arm 154 to that at which the roller 161 is positioned is pivotally secured to the upper face thereof as by screw 164 an apertured arm 165 having positioned in the aperture thereof a coiled spring 166 which has the outer end portion thereof coiled about a stud 167 secured to the nut 160 and engaging said nut so that said spring will constantly urge said arms longitudinally for maintaining the roller 161 in contact with the cam 162.

The outer or free end of the arm 154 is provided with a tip 168 similar to the tip 124 provided on the feed arm 108 and adapted to engage the body of the bottle during the rotation of said arm for moving said bottle from a position over the plunger 106 onto the conveyor A.

The contour of the cam 162 is such that during the initial rotary movement of the shaft 155 and arm 154 and just previous to said arm engaging the bottle resting upon the plunger 106, the cam will permit said arm to be moved outwardly in the extended position by the action of the spring 166 so that the tip 168 may properly engage the body of the bottle for causing said bottle to be moved by the arm from a position over the plunger 106 toward the conveyor A.

As the bottle moves outwardly toward the conveyor, it will engage the rear face of the guide arm 99 which, when in its normal position against the stop pin 102, is adapted to be engaged by said bottle and to co-operate with the forward inner face of the frame 127 and plate 125 for guiding the bottle forwardly as it is being moved outwardly by the ejector arm 154 until said bottle is properly positioned upon the conveyor to be carried away from the bottle-capping mechanism by said conveyor.

As soon as the bottle has been properly positioned upon the conveyor A, the contour of the cam 162 will permit the ejector arm 154 to be again moved inwardly against the action of the spring 166 so that as said arm continues its rotary movement, the inner or free end of said arm will freely pass between the legs 132 and 133 of the respective bottle-positioning member 130 inside of the transverse portion of said member.

It will now be understood by referring more particularly to Figure 6 that the hereinbefore-mentioned train of gears for operating the bottle-holding and release arm 89 and the feed arm 108 consists of the hereinbefore-described spur gear 148 secured to the shaft 12, the idle gear 149 and spur gear 147 for operating the bottle positioning cam 145, together with an idle gear 170 rotatably mounted upon a shouldered stud 171 secured to the bed-plate 2 intermediate the shaft 146 and the shaft 109 for maintaining the idle gear 170 in meshing engagement with the gear 147 and with the gear 111 which operates the feed arm shaft 109.

The gear 111 is also in meshing engagement with the gear 97 so that any movement of the drive shaft 12 will transmit a corresponding movement in predetermined timed relation to the bottle-positioning cam 145, the feed arm 108 and the bottle-holding and release arm cam 94.

It will also be observed by referring to Figure 6, that the ejector arm 154 will also be moved in synchronism with these members due to the drive gear 156 for said arm being driven from the gear 147 through the medium of the idle gear 157, as hereinbefore explained.

Bottle-actuating plunger

The hereinbefore-mentioned bottle-lifting plunger 106 and means for operating the same, as illustrated more particularly in Figures 5, 6 and 35 to 38 inclusive, comprises a hollow boss 173 positioned adjacent the forward central portion of the base 1 and made integral with said base and with the rib 16. The plunger 106, in this instance, is circular in cross-section and has an easy sliding fit in the opening as 173' in the boss 173. The upper end of the plunger 106 is slightly reduced in diameter and extends upwardly through a corresponding opening provided in the bed-plate 2 in alignment with the opening in the boss 173, said plunger having a close sliding fit in said opening in the bed-plate so as to prevent liquid, such as wash water, spilt milk or the like, from passing downwardly through the plunger opening and corroding or polluting the mechanism below the bed-plate.

The plunger 106 is reciprocated vertically to carry the bottles to and from their cap-receiving position by a rearwardly extending substantially horizontally disposed rock arm 174 which is pivotally mounted near its rear end upon a stud 175 mounted in a bracket 176 secured to or made integral with the base 1.

A cam roller 177 is rotatably mounted upon a stud 178 secured to the arm 174 intermediate the pivot 175 and the forward end thereof. The roller 177 is in engagement with a cam groove 179 formed in the periphery of a cam member 180 secured to the drive shaft 12 just above the rib 16, as clearly illustrated in Figure 5.

The forward end of the arm 174 extends through a vertically disposed slot 181 provided in the wall of the plunger-supporting boss 173 and terminates in a vertical recess or slot 182 which extends diametrically through the plunger 106 near the lower end thereof and which is of greater vertical height than the end of said arm. The forward end of the arm 174 is bifurcated as at 174', and has positioned therein a roller 184 which is rotatably mounted upon a pin 185 secured at its ends in the arm 174. The roller 184 is positioned between an adjusting screw 186 screw-threaded in the lower end of the plunger 106 and a spring-actuated pin 187 mounted in a suitable opening in the upper end of the plunger. The spring as 188 for actuating the pin 187 is of sufficient tension to maintain the arm in constant contact with the screw 186 under normal load, and at the same time, provides a yielding connection between the arm 174 and the plunger 106 so that the bottle may be brought to the capping position without danger of damaging the bottle or the capping mechanism. The upper end of the plunger 106 may be positioned and maintained flush with the upper surface of the bed-plate 2 when the plunger is in its lowermost position by the manipulation of the screw 186 which may be locked in the adjusted position by a lock nut 189. The positioning of the upper end of the plunger 106 flush with the upper surface of the bed-plate 2 is for the purpose of permitting the bottles to be smoothly moved from the bed-plate onto the plunger by the action of the feed arm 108.

The rear end of the arm 174 is extended a relatively short distance beyond the pivotal shaft 175 and has secured thereto, one end of a tension spring 190 which has the other end connected with the bottom 6 of the base 1 by means of a screw stud 191. The tension of the spring 190 is such as to counterbalance the plunger 106 and to assist the cam 179 in moving the plunger and bottle carried thereby upwardly into engagement with the cap-forming and applying mechanism and thereby contribute to a more uniform and efficient operation of the machine.

Cap blank

The cap disks as D, Figure 27, from which the caps are made, are similar in form to the disks shown and described in the hereinbefore-mentioned co-pending application of J. F. Mitchell, Serial No. 555,458 except that the disks are left integral at one side when cut to form a continuous strip s of disks which is wound into a coil preparatory to capping the bottles. The disks D are substantially hexagonal in plan view and have the central portion scored as at d defining a hexagonal outline of sufficient size to circumscribe the rim b of the bottle B, see Figures 56 and 58. Other score lines as e and f extend outwardly in diverging planes from each corner of the hexagon formed by score lines d to the edge of the blank to form substantially rectangular portions x at alternate sides of the disk, conical portions y of greater area than that of the portions x at the other sides of the disk and triangular portions z intermediate the adjacent ends of the portions x and y. These latter portions z are of sufficient size to permit the skirt to readily fold during the plaiting of the skirt in such a manner that the larger portions y may overlap the smaller portions x when folded about the neck of the bottle, as will hereinafter more readily appear. At the junction of one disk with another is provided a pair of transversely spaced apertures h for receiving driving pins presently described.

Cap-forming and applying mechanism

The cap-forming and applying mechanism consists primarily of a cap blank feeding apparatus adapted to automatically feed one cap-forming blank at a time over the mouth of a bottle resting upon the plunger 106, a cap-forming mechanism adapted to form the disk into a skirted cap over the mouth of the bottle and at the same time to plait the skirt of the cap, a mechanism for closely and securely folding the plaits about the neck of the bottle and a suitable means for securing the skirted cap in position on said bottle such as a staple mechanism, all of which are mounted within or upon the case 13 in co-operative relation with each other and with the bottle plunger 106.

The case 13 is provided with a centrally located hub member 194 positioned at the upper end portion thereof and connected thereto by integral ribs 195. The hub 194 supports a head member 196 which, in turn, supports the various elements of the cap-forming and securing mechanisms, as will hereinafter more readily appear. This head 196 consists of a circular disk-like body portion 197 positioned in the lower end portion of the case 13, a cylindrical portion 198 of less diameter than the head and which extends upwardly from the central portion of the head and spaces said head from the hub 194 and a tubular member 199 which extends upwardly from the cylindrical portion 198 into the bore of the hub 194. The head is secured to the hub member 194 by means of screws 200 in the manner illustrated more clearly in Figure 5.

The upper end of the case 13 is closed by a cap 13' which has mounted upon the upper end thereof a cap blank magazine 201 adapted to contain a coil of cap blanks. The magazine 201 and cap 13' are removably secured together and to the case 13 by means of a plurality of, in this instance three, studs 202 screw-threaded in the hub 194 to extend upwardly through the cap 13' and a knurled nut 203 rotatably mounted upon the lower end of a pendent boss 204 made integral with the lower portion of the magazine 201.

In order that the nut 203 may readily engage the studs for locking the magazine and cap to the case, the upper ends of the studs are provided with peripheral slots 202' while the nut is provided with three elongated slots 205 arranged in uniform circumferential spaced relation in the under-face of the nut, adapted to receive the upper end of respective studs therein. Each of the slots 205 is provided with an inwardly extending flange member 205' at the outer side thereof adapted to engage the slot 202' in the respective stud when the nut is rotated in one direction and to release said studs when rotated in the opposite direction.

Cap blank feed mechanism

The magazine 201 is U-shaped in cross-section, with the open side thereof closed by a door 207 (see Figures 1 and 41) which is hinged to one side of the magazine 201 as at 208. A shaft 209 is secured in the closed side 201' of the magazine to extend centrally through the magazine and has the inner end provided with a threaded aperture 210 adapted to receive a stud 211 journaled in the door 207. The inner end of the stud 211 is enlarged and threaded, while the outer end extends through the door and has a wheel 212 secured thereto by which the stud may be rotated for engaging the same with the shaft 209.

Upon the shaft 209 is mounted a pair of friction disks 213 and 214, one of which, as 213, is held against rotation by a headed stud 215 co-operating with the shaft 209 and which is slidably mounted in the wall 201' to permit axial movement of the disk along the shaft 209 to permit the disk 213 to frictionally engage the disk 214. The disk 214 is removably secured to the core as 216 for the coil of cap disks so as to be rotated by the core during the unwinding of the coil by means of a pin 217 secured to the disk 214 so as to project into a suitable aperture provided in the end of the core 216. The disk 213 is urged into frictional engagement with the disk 214 by means of a coiled spring 218 positioned between the disk 213 and the wall 201'. The core 216 is maintained against outward axial movement along the shaft 209 by means of a bearing collar 219 mounted upon the inner end of an inwardly projecting tubular boss 207' provided on the door 207.

The free end of the coil of blank disks positioned in the magazine upon the shaft 209, is threaded through a suitable slot 201'' provided in the lower peripheral wall of the magazine over a guide roller 221 rotatably mounted between a pair of pendent ears 222 provided on the magazine 201 at opposite sides of the slot 201''. The strip of blanks is then passed downwardly over a guide plate 223 secured at its lower end to the case 13 and then outwardly between a pair of superposed rollers 224 and 225. These rollers 224 and 225 are mounted upon respective horizontally disposed shafts 226 and 227 (see Figures 40 and 44), mounted at one end in a gear case 228 secured to the peripheral surface of the case 13 in any suitable manner as by screws 229 (Figure 47) and at their other ends in a bracket 230 secured to or made integral with the case 228.

The lower roller, as 225, is of relatively large diameter and is provided with a plurality of, in this instance four, sets of hereinbefore-mentioned drive pins 231 arranged in uniform circumferential spaced relation in the periphery of the roller 225. There are two pins 231 in each set which are arranged in spaced relation transversely of the roller for engaging respective apertures $h$ in the cap blank strip $s$. The upper roller 224 is rotatably mounted upon the shaft 226 and is provided with a pair of axially spaced grooves 224' adapted to receive the pins 223 therein.

The shaft 227 is rotatably mounted in the case 228 and bracket 230 and has the feed roll 225 secured thereto so as to be driven thereby. The shaft 227 and feed roll 225 are intermittently driven by the rotation of the drive shaft 12 in the following manner:

It will be noted by referring to Figures 5 and 43 that a spiral gear 232 is slidably mounted on the shaft 12 and positioned between upper and lower portions of a gear case 233 secured by screws 234 to a pendent portion 235 of the case 13 so that the gear will be moved by the case 233 along the shaft 12 when the case 13 is being adjusted for capping bottles of different heights, in a manner hereinafter more fully explained.

The gear 232 is in meshing engagement with a similar spiral gear 236 secured to a horizontally disposed shaft 237 mounted in the case 233. One end of the shaft 237 extends beyond the case 233 and is connected by a coupling 238 with a horizontally disposed shaft 239 journaled in the lower end of the gear case 228 in axial alignment with the shaft 237. Upon the shaft 239 is secured a spiral gear 240 which is in meshing engagement with a similar spiral gear 241 mounted upon a horizontally disposed shaft 242 journaled in the gear case 228 intermediate the shaft 239 and the drive roller shaft 227. The shaft 242 is operably connected with the shaft 227 by a Geneva movement consisting of a star wheel 243 mounted upon one end of the shaft 227 and a drive arm 244 and locating disk 245 mounted upon the shaft 242. The outer end of the arm 244 is provided with a studded roller 246 adapted to engage the radial slots as 243' of the star wheel 243.

The blank strip $s$ passes around the outer portion of the periphery of the drive roller 225, as clearly illustrated in Figure 40 and then inwardly beneath the case 13 over a second guide plate 247 secured to the under-surface of a paper guide member 248 secured to the under-face of a cover plate 249 by means of screws 250, as illustrated in Figures 48 and 53, said cover plate being secured to the under-surface of the body 197 of the head 196 by means of screws 251, see Figures 59 and 64.

A pressure roll 253 is positioned adjacent the lower portion of the drive roll 225 for maintaining the blank strip $s$ in contact with the drive pins 231 just prior to the strip leaving the drive roll so as to insure an accurate feeding and positioning of the cap disks by the roller in operative relation with the cap-folding and applying mechanism presently described. This pressure roll 253 is rotatably mounted upon a shaft 254 carried in the outer ends of a U-shaped bracket 255 which, in turn, is rotatably mounted upon a shaft 256 secured at its ends in the gear case 228 and bracket 230, see Figures 40 and 46. The central portion of the roll 253 is provided with a resilient bushing 253' preferably composed of rubber or similar material and adapted to engage the periphery of the feed roll 225 intermediate the drive pins 231, while the bushing 253' is yieldingly urged toward the periphery of the feed roll 225 by means of a spring 257 having one end connected with the bracket 255 and the other end secured to the gear case 228.

The disk guide member 248 is formed in two sections 248' and 248'' as illustrated in Figure 48. The sections are arranged end to end and provided with a longitudinally extending groove in the under-surface thereof forming a recess 257 between the guide member 248 and plate 247 for receiving the disks D. The outer end of the guide member 248 has secured thereto a stripper plate 258 arranged in spaced relation to the guide plate 247 and adapted to engage the periphery of the feed roll 225 for stripping the disks from the drive pins 231 and guiding the same into the recess 257. The stripper plate 258 has inwardly extending slots 258' provided in the outer edge thereof to permit the passage of the drive pins past the plate.

The inner end of the guide member 248 terminates near the center of the lower end of the case 13 and is provided with a circular opening 260 therethrough having a bore substantially equal to the width of the recess 257 and, therefore, of the cap blank to permit the cap blank to freely pass upwardly therethrough. The guide plate 247 is also composed of two sections, one for each section of the guide member 248 and the portion of the guide plate positioned beneath the inner section as 248'' of the guide member is provided with an opening 261 therethrough in concentric alignment with the openings 260. The opening 261 is of less diameter than the opening 260 so that the cap blank will be supported by the plate 247 beneath the opening 260, but the opening 261 is of greater diameter than the mouth of the bottle to permit the bottle to freely pass upwardly through said opening.

Secured to the plate 247 and guide member 248 are three bottle centering fingers 262 arranged 160 degrees apart with the ends extending inwardly beyond the edge of the opening 261 and terminating in such relation as to form a passageway therethrough concentric with the openings 260 and 261 of sufficient size to permit the upper end of the bottle to freely pass therethrough and, at the same time, engage the rim of the mouth of the bottle if the mouth of the bottle is out of alignment with said openings and bring the mouth of the bottle into concentric relation therewith and therefore with the cap blank positioned at said openings.

Cap blank cut-off means

As the strip of cap blanks comes to rest, the end blank in registration with the openings 260 and 261 is severed from the adjacent blank by means of a cut-off knife 264 positioned in a transversely disposed slot 265 formed in the under-surface of the guide member 248 intermediate the member sections 248' and 248", as illustrated more clearly in Figures 40, 49 and 50. This knife 264 is pivoted as at 266 to a bracket 267 secured to the cover plate 249 at one side of the blank guide member 248, as illustrated in Figure 48. The other end of the knife extends a short distance beyond the opposite side of the guide member 248 into engagement with a spring-actuated rock arm 268 pivoted at 269 to a bracket 270 secured to the cover plate 249, said rock arm being actuated by the spring as 271 for yieldingly maintaining the knife in its upper inoperative position. The central portion of the knife 264 is provided with a cutting edge 264' which, when the knife is in its uppermost position, is in a plane above the recess 257 in alignment with the joined portions of the two adjacent cap blanks so that when the knife is caused to move downwardly, said cutting edge will pass through the blank strip in operative engagement with a shear bar 272 which extends transversely of the guide member 248 and has the ends thereof secured to respective sides of said member by screws 273.

The means for causing the knife 264 to be moved downwardly for severing the blank strip consists, in this instance, of a plunger 274 slidably mounted in aligned apertures formed in the head cover plate 249 and the body 197 of the head 196 arranged over the knife 264 near the outer end thereof. The plunger 274 is actuated by means of a plurality of, in this instance three, cam blocks 275 secured in equal circumferential spaced relation to the underside of a rotating cam disk 276 mounted upon the upper face of the body 197 in the manner presently described.

Cap-forming and plaiting apparatus

The cam member 276 is an annular disk mounted upon the upper surface of the body 197 of the head 196, with the cylindrical portion 198 of said head extending through the central opening of the cam member so as to maintain said cam against lateral displacement during the rotation of the cam. To the upper surface of the cam member 276 is secured a ring gear 278 which is in meshing engagement with a pinion gear 279 slidably mounted on the drive shaft 12 and positioned between the hereinbefore-mentioned bearing members 17 and 18 provided on the casing 13 (see Figure 5).

The pinion 279 is splined to the shaft 12 so as to be rotated by said shaft and, at the same time, permit the pinion to move axially along the shaft during the adjustment of the head 13 for moving the bottle-capping mechanism into position for capping bottles of different heights.

The body 197 of the head 196 is provided with two sets of radially disposed guide slots or channels 280 and 281 in the undersurface thereof for the reception of the cap skirt folding means and the securing means for maintaining the skirt in the folded position upon the bottle. There are three of these channels in each set and the channels of the sets are arranged alternately in uniform circumferential spaced relation. In other words, one set of channels as 280 is adapted to operably receive the skirt-folding mechanisms which are positioned 160 degrees apart, while a novelly constructed stapling mechanism presently described is mounted in each of the channels 281 midway between adjacent folding mechanisms. As the folding mechanisms are identical in construction and operation, a description of one will suffice for an adequate understanding of the others.

Each of the folding mechanisms consists of a substantially rectangular slide 284 mounted for longitudinal reciprocative movement in the upper portion of a channel 280 upon a retaining plate 285 secured by screws 286 to the body 197 (see Figures 59 and 61). The slide 284 is provided with a longitudinally disposed slot 284' in which is slidably positioned a drive block 287 which has secured thereto an upwardly extending shouldered stud 288 (see Figures 65 and 66). This stud extends upwardly through an elongated slot 289 formed in the body portion 197 into a cam groove 290 formed in the under-surface of the cam disk 287 and has rotatably mounted on the upper end thereof, a roller 291 adapted to travel in said cam groove. The cam groove 290 is provided with a plurality of, in this instance three, cam surfaces as 290' arranged 160 degrees apart so that the cam blocks 287 will be actuated to produce one cycle of movement three times during each revolution of the cam disk 276.

A compression spring 292 is positioned in the slot 284' between the inner or forward end of the drive block 287 and the forward or inner end of the slot for the purpose of yieldingly causing the forward movement of the drive block 287 to be transmitted to the slide 284 to bring the folding fingers as 293 carried by said slide into engagement with the adjacent portion of the cap skirt for folding the plaits of said skirt about the head of the bottle, and for this purpose, the inner vertical face of each finger is concaved to conform to the contour of the adjacent head and neck portions of the bottle. There are two of these fingers 293 for each slide 284 (see Figures 56, 59 and 66) and they are pivotally secured to the forward end of the respective slide in the following manner:

A bracket or fulcrum block 294 is pivotally mounted as at 295 upon a tongue 284" formed upon the forward end of each slide 284. The bracket 294 extends outwardly from each side of the slide 284 a relatively short distance and has pivotally secured thereto as at 296 a respective finger 293 so that the fingers 293 may have a vertical and horizontal swinging movement relative to the slide to permit said fingers to readily adjust themselves to any variation in the contour of the surface of the bottle. The vertical swinging movement, however, of the fingers is limited by shoulders 284''' provided on the tongues 284' in proximity to shoulders 294' provided on the adjacent portion of the blocks 294 so that the fingers 293 will always be maintained in a convenient position for engaging the skirt of the cap.

Beneath the skirt-folding mechanism just described is positioned two sets of cap skirt breakdown fingers 298 and 299 which are secured to the cover plate 249, as illustrated more clearly in Figures 5, 40 and 59. These breakdown fingers are arranged in uniform circumferential spaced relation about a horizontal opening as 249' formed in the cover plate 249 of greater diameter than that of the bottle to be capped and which is arranged in concentric alignment with the openings as 260 and 261 provided in the cap strip guide member 248 and plate 247. One set of the breakdown fingers, as 299, is positioned beneath a respective channel 280 and the skirt-folding mechanism carried thereby, while the other set of fingers as 298 is positioned beneath a respective channel 281 formed in said head and the securing or stapling means carried therein.

The fingers 298, as illustrated more clearly in Figures 40, 54 and 55 are of less width at their inner ends than that of the fingers 299 and are positioned in a plane slightly below that of the fingers 299 so as to first engage the adjacent portion of the cap blank as the bottle with the blank thereon is moved upwardly through the opening 249' in the cover plate 249. In other words, the scoring on the cap blanks and the position and form of the breakdown fingers 298 and 299 are so related that when the blank is moved upwardly through the opening 249, the fingers 298 having the lesser width will engage the smaller or rectangular portions $x$ of the disks during the initial movement of said disks for folding said portions of the disk downwardly over the bead of the bottle, after which the larger or conical portions $y$ of the skirt will be engaged by the fingers 299 having the greater width for folding said portions $y$ over the bead of the mouth of the bottle in overlapping relation with the portions $x$, as illustrated more clearly in Figures 54 and 55.

It will be noted by referring to Figures 5, 40, 59 and 65 that the head 196 is provided with a recess or chamber 300 which extends upwardly from the lower face thereof in concentric alignment with the opening 249' provided in the cover plate 249. This chamber is of slightly greater diameter than that of the opening 249' and is adapted to receive therein the upper end of the bottle with the cap blank mounted thereon. A central bore 301 extends upwardly from the chamber 300 through the cylindrical portion 198 and tubular member 199 of the head 196 and has slidably mounted therein a tubular plunger 302 which is yieldingly maintained in its lowermost position by a compression spring 303 against a limiting stop or pin 304 which is mounted in the tubular member 199 in tangential relation to the central opening therethrough and an elongated slot 302' formed in the periphery of the plunger 302.

The lower end of the plunger 302 has secured thereto a platen 305 which is normally positioned, when the plunger is in its lowermost position, within the opening 260 provided in the blank guide 248 in a plane slightly above the recess 257 and, therefore, that of the cap disk when said disk is in registration with the opening 260.

The spring 303 extends downwardly through the interior of the plunger 302, with the lower end thereof engaging platen 305 (see Figure 5) while the upper end of the spring engages a transverse portion 306 of a pendent hollow boss 307 provided on the cap 13'. The platen 305 is preferably hexagonal in plan view and of substantially the same dimensions as the central hexagonal portion, as outlined by the score lines $d$ of the cap disks D so that when a disk is brought into engagement with the platen by the upward movement of a bottle in a manner which will hereinafter be more fully described, the central portion of the disk will engage and be substantially covered by said platen for firmly maintaining this central portion of the disk upon the head of the bottle and prevent buckling or crimping of the central portion of the disk as the peripheral or skirt portion thereof is being formed over the bead of the bottle during the engagement therewith with the breakdown fingers 298 and 299.

*Cap-securing means*

As hereinbefore indicated, the skirt of the cap may be secured in any suitable manner in the folded position about the neck of the bottle, and for this purpose, there is indicated in the drawings and more particularly in Figures 59, 64 and 67, a plurality of, in this instance three, stapling mechanisms which are mounted upon the cover plate 249 in a respective hereinbefore-mentioned channel 281 provided in the head 196. Inasmuch as the stapling mechanisms are identical in construction and operation, a description of one will be sufficient for an adequate understanding of the others.

Each of the stapling mechanisms consists of a pair of slide guide blocks 310 positioned one at either side of a channel 281 and secured to the head 196 by means of screws 311. Slidably mounted upon the cover plate 249 and guide by the blocks 310 is a wire cut-off and bending slide 312. This slide consists of a relatively flat body portion 313 provided at the outer end thereof with a pair of longitudinally spaced vertical disposed lugs 314 of less transverse width than the body and which extend upwardly to substantially the upper wall of the channel 281. The forward or inner end of the body 313 is formed with a raised portion 315 which is of less width than the remaining portion of said body, as illustrated in Figure 68. This raised portion 315 is provided with a longitudinally extending centrally located channel 316 having a guide groove 317 in each side wall thereof.

In the channel 316 is slidably mounted a staple drive slide 318 which has each longitudinal side wall provided with tongues 319 guided in a respective groove 317. The forward or inner end of the slides 318 and 312 are formed concave to conform substantially to the contour of the neck of the bottle in the plane of the staples when the cap is secured to the bottle. The drive slide 318 is provided with a groove 318' which extends across the forward end thereof from one guide groove 317 to the other groove for the purpose of receiving the transverse portion of the staple during the driving of the staple.

The staple wire as W is intermittently fed in a manner hereinafter to be described, through a guide tube 320 secured in the inner end of one of the slide guide members 310 and across the face of the inner ends of the slides 312 and 318 in the plane of the groove 318' when said slides are in the outermost inoperative position, as shown in Figure 68.

The tube 320 preferably consists of tempered steel or its equivalent and has the inner end thereof terminating in the plane of movement of the adjacent outer edge of the forward portion 315 of the cut-off slide 312 to provide a shearing edge in co-operative relation with the portion 315 which has the forward end thereof grooved as at 315' to form a cutting edge for severing the wire to produce a piece of wire of required length to form the staple.

The drive slide 318 is provided with a longitudinally extending elongated slot 322 near the outer or rear end thereof which receives the inner or forward lug 314 of the slide 312 therethrough. The slide 318 is yieldingly maintained in its foremost position relatively to the slide 312 by means of an expansion spring 323 positioned in the slot 322 between the forward end thereof and the lug 314.

A staple-holding latch member 324 is positioned over the forward end of the drive slide 318 and has the forward end thereof extended downwardly and normally positioned in front of the slide 318 and has the undersurface thereof provided with a transversely disposed slot 324' in alignment with the wire guide tube 320 for receiving the wire W therein as the wire is fed through the tube 320. The latch 324 is pivoted near its rear or outer end upon a pivotal rod 325 which is mounted at its ends in the slide guide members 310, as illustrated more clearly in Figure 59.

The latch is yieldingly urged into engagement with the upper face of the slide 318 by a spring 326 mounted in a socket in the adjacent portion of the head 196 and engaging the latch 324 intermediate the pivot 325 and the inner end thereof. The latch 324 is provided with a retaining shoulder 324' in its lower edge normally positioned in the path of movement of a similar shoulder 318'' formed on the upper face of the staple drive slide 318 for the purpose of maintaining the drive slide 318 against forward movement during the major portion of the forward movement of the wire cut-off and bending slide 312. The latch 324 is extended rearwardly or outwardly from the pivot 325 to form a cam surface 327 adapted to be engaged by the forward end 328' of a trip slide 328 slidably mounted in the upper portion of the slide guides 310 for the purpose of raising the forward end of the latch and bringing said latch out of engagement with the wire and with the staple driving slide 318.

The trip slide 328 is mounted in a plane above the staple driving slide 318 over the rear portion of the slide 312, as illustrated more clearly in Figures 64 and 67. This slide is provided with an elongated slot 329 near the rear or outer end thereof adapted to receive the forwardly positioned lug 314 therethrough. The slide is yieldingly maintained in its outermost position against the lugs 314 by a spring 330 mounted in the slot 329 intermediate the rear face of the forward lug 314 and the rear end of the slot 329. The upper face of the forward end of the slide 328 is provided with a transverse recess 331 in which is positioned a pendent portion of a drive block 332 which is mounted upon the upper face of the trip slide 328 in an elongated radially disposed slot 333 formed in the adjacent portion of the body of the head 196.

A stud 334 is secured in the drive block 332 and extends upwardly into a cam groove as 335 formed in the lower face of the cam disk 276 and has rotatably mounted on the upper end thereof a cam roller 336 adapted to travel in said cam groove. The cam groove 335 is provided with a plurality of, in this instance three, inwardly extending cam surfaces 335' which are arranged in equal circumferential spaced relation so that the driving blocks 332 of each of the stapling mechanisms will be actuated three times for producing a corresponding number of stapling operations during each revolution of the cam disk 276.

It will be noted by referring to Figure 65 that the inwardly extending cam portions 335' of the cam groove 335 are positioned in radial planes intermediate that of the inwardly extending cam surfaces 290' of the cam groove 290, that the portions 335' are of less length circumferentially than that of the portions 290 and that these cam surfaces are so related to the respective rollers 336 and 291 that the wire stapling mechanism will be actuated by the passing of the rollers 336 through the cam surfaces 335' after the folding fingers 293 have been moved into engagement with the plaits of the cap and folded the same against the neck of the bottle by the action of the cam surfaces 290' upon the rollers 291.

In operation, the trip slide 328 is first moved forwardly by the action of a cam surface 335' upon the roller 336 through the medium of the drive block 332. This forward movement of the trip slide 328 produces a forward or inward movement of the wire cut-off and bending slide 312 through the spring 330 against the action of the spring 323 which has the forward end thereof maintained against inward movement by the engagement of the latch 324 with the shoulder 318'' of the slide 318. During the initial forward movement of the wire cut-off and bending slide 312, the wire is severed by the shearing action of the forward end of the slide with the guide tube 320 after which the outer ends of the cut-off portion of the wire which at this time are in engagement with the slots 315', are carried forwardly by the slide 312 and bent at right angles to the intermediate portion of the wire which is positioned within the slot 324' of the latch 324 and maintained against forward movement by said latch to form the staple.

It will be noted that after the staple has been formed, the legs of the staple will be positioned within a respective guide groove 317 which prevents the staple from escaping from the slot 324' in the latch 324 until said latch is moved out of engagement with the wire.

As the strip slide 328 approaches the limit of its forward movement, the forward end portion 328' will engage the cam surface 327 of the latch 324 and move the forward portion of said latch upwardly against the action of the spring 326 out of holding engagement with the wire W and also with the staple drive slide 318, thereby releasing the slide and permitting the same to be driven forwardly by the action of the spring 323 which will then have been compressed by the forward movement of the cut-off slide 312. This forward movement of the staple drive slide 318 will bring the forward end of the slide into engagement with the transverse portion of the staple which will then register in the transverse slot 318' of said slide and drive the staple forward into stapling engagement with the adjacent portion of the cap skirt and staple said portions of the skirt in their folded position about the neck of the bottle.

As the rollers 336 are moved outwardly by the continued movement of the cam groove 335, the drive block 332, slides 328, 312 and 318 will again be returned to their normal outermost inoperative positions and the latch member 324 will be returned by the spring 326 to its normal lowermost position for holding the slide 318 against forward movement and in position to receive the wire W in the slot 324' as said wire is again fed intermittently through the guide tube 320.

Wire stapling mechanism

The wire W from which the staples are formed is fed from a plurality of, in this instance three, reels, one reel for each stapling mechanism by respective wire feeding devices through their respective guide tubes 320 to their staple severing and bending positions in the respective stapling mechanisms. The reels, as R are journaled within the upper portion of the cap 13', (see Figures 70 and 71) upon the upper ends of upwardly extending arms 340 secured to or made integral with respective brackets 341 arranged in uniform circumferential spaced relation within the case 13, said bracket being secured by screws 342 to lateral projections as 343 and 344 (see Figures 70 and 80) provided on the inside of the case 13 and periphery of the hub 194 respectively.

Each reel R consists of a pair of hubbed flanges 345 which are secured to a spindle 346 to rotate said spindle (see Figures 71, 74, 75 and 76).

The upper ends of the bracket arms 340 are provided with inwardly extending slots in which the spindle 346 is journaled. The ends of the spindle extend outwardly a short distance beyond the respective arm and have frictionally engaged therewith a pair of brake arms 347 which prevent spinning of the spindle and reel during the unwinding of the wire. These arms are pivotally mounted upon a shouldered stud 348 secured to the respective arm 340 in a plane below the spindle 346. The lower ends of the arms extend a short distance below the stud 348 and are yieldingly urged outwardly by an expansion spring 349 for bringing the upper ends of the arms into frictional engagement with the adjacent portions of the spindle 346, the upper ends of the arms being recessed to receive said spindle therein.

By referring to Figure 71 and Figures 77 to 81 inclusive, it will be noted that the wire W is fed from the reels R through a respective intermittent feed mechanism, and as these feed mechanisms are identical in construction and operation, an explanation of one will answer for the others. Each of these feed mechanisms consists of a pair of grooved feed rolls 350 and 351 arranged in peripheral contact upon respective studs 352 and 353.

The grooves, as 354, of each roll 350 and 351, are practically of the same cross-sectional area as the wire so that the wire will be frictionally engaged by the surface of said grooves for producing a substantially positive movement of the wire. Guide tubes as 355 and 356 are positioned one at either side of the contacting surfaces of the rollers 350 and 351 for guiding the wire through the grooves 354. These tubes are clamped in respective supporting blocks 357 which, in turn, are secured to the adjacent portion of the bracket member 341, as illustrated more clearly in Figure 80.

The stud 353 upon which the roller 351 is mounted is secured to a supporting block 358 which, in turn, is secured by a screw 359 to the bracket 341. The drive roll 351 is rotatably mounted upon one end of the stud 353 and has secured thereto a spur gear member 360 which is in meshing engagement with a similar gear 361 splined to the stud 352 for the roller 350.

The stud 352 also has the drive roll 350 secured thereto to be rotated thereby. This stud is rotatably mounted in the bracket 341 and extends through said bracket and has secured to the outer end thereof, a ratchet wheel 362 which is adapted to be intermittently driven by a pawl 363 rotatably mounted upon a shouldered screw 364 secured to the upper end of a rock arm 365 which is rotatably mounted intermediate its ends upon the outer end of the stud 352.

The end of the arm 365 opposite that to which the stud 364 is secured has journaled therein a studded block 366 which is positioned in a slot 367 provided in an upwardly extending portion of a drive block 368 which is slidably mounted for longitudinal reciprocative movement in a guide slot 369 provided in the lower portion of the bracket 341. The drive block 368 is maintained in the slot by gibs 370 secured to the undersurface of the bracket 341. This block also has secured thereto a pendent pin 371 which has rotatably mounted on the lower end thereof a roller 372 which is positioned above the ring gear 278 in position to be engaged in a cam groove 373 provided on the upper face of the gear. There are three of these cam grooves 373 arranged in uniform circumferential spaced relation and each of the grooves is formed by a pair of cam blocks as 374 and 375 secured in radial spaced relation to the upper face of the ring gear 278, as illustrated more particularly in Figures 72 and 73.

The wire guide tube 356 extends from the vicinity of the drive rolls 350 and 351 downwardly into operative alignment with a guide passage 377 formed in a wire straightening block 378 to which the tube is secured by a clamping block 379.

Each straightening block 378 is positioned intermediate the cover plate 249 and the head 196 beneath a channel 280 and is secured to the body portion by means of screws 380, as illustrated in Figures 59, 60 and 61. Intermediate the ends of the passage 377 in the straightening block 378 is arranged a plurality of wire straightening pins 381. These pins are arranged in two sets extending at right angles to each other, with the pins of each set arranged in staggered relation adjacent opposite sides of the passage 377. The pins have an eccentric portion as 381' which are positioned adjacent the passage 377 and are maintained in the adjusted position within the block 378 by means of respective clamping screws 382 so that the wire passing through the passage 377 will engage the eccentric portion of each pin and be straightened thereby. The degree to which the eccentric portion 381' of the pins are caused to project into the passage 377 may be determined by rotation of the pins within the respective sockets and then the pins may be maintained in the adjusted position by the screws 382.

The outlet end of the passage 377 is connected with a respective guide tube 320 mounted in the forward end of one of the slide guide members 310 by means of a guide tube 383 which has one end thereof secured in a clamp 384 secured to the block 378, while the other end of the tube is mounted in the outer end of the recess provided in the slide guide 310 for the tube 320, as illustrated in Figure 60.

It will now be observed by referring to Figure 72 that the cam grooves 373 of the straight staple drive mechanism, are arranged in uniform circumferential spaced relation upon the upper face of the ring gear 278 so that there will be three inward and outward movements of each roller 372 during each revolution of the ring gear 278 and upon each cycle of movement of the rollers 372, a corresponding sliding movement will be produced upon the corresponding slide 368. This reciprocating movement of the slides 368 will produce a corresponding rocking movement of the rock arms 365 which, during the initial movement thereof, will cause the upper end of the arm and the pawl 363 carried thereby to be moved inwardly to bring the free end of the pawl over the surface of the ratchet 362 into engagement with the next succeeding tooth of the ratchet, and during the reverse or inward movement of the slide 368, the upper end of the arm and the pawl will be carried forward or outwardly to produce a forward movement of the ratchet 362. This movement of the ratchet 362 will produce a corresponding inward rotating movement of the stud 352 upon which is secured the drive roll 350 and the spur gear 361. This intermittent rotating movement of the studs 352 will be transmitted to the studs 352 and, therefore, to the rollers 351 by the action of the spur gears 361 upon the spur gears 360 so that during each cycle of operation of the rollers 372 caused by the engagement therewith with a respective cam groove 373, these drive members will produce a positive predetermined intermittent rotary movement of the drive rolls 350 and 351 which will feed a predetermined length of wire through the guide tubes 320 into operative relation with the stapling mechanisms in position to be formed into staples in the manner hereinbefore described.

*Cap-forming and applying mechanism adjusting means*

In order that the case 13 and the cap-applying and securing means carried thereby may be readily brought into predetermined spaced relation with the bottle-raising plunger 106 to properly position the cap-applying and securing means for capping bottles of different heights, I have provided a manually controlled power-operated mechanism for producing this required vertical movement of the case. The mechanism for accomplishing this result consists of a bevel gear 386 secured to the drive shaft 11 of the gear-reducing unit which, as illustrated in Figures 3 and 4, is in meshing engagement with a pinion 387 mounted upon one end of a horizontally disposed shaft 388 journaled in a bracket 389 formed upon the upper face of the cover plate 10' for the case 10. The other end of the shaft 388 has secured thereto a bevel gear member 390 which is in meshing engagement with a similar gear 391 secured to a vertically disposed shaft 392. This shaft has its lower end journaled in a suitable bearing provided in the cover plate 10' and extends upwardly through the base 1 and has its upper end journaled in a bracket 393 secured to the under-face of the bed-plate 2.

Secured to the upper end of the shaft 392 is a gear 394 in meshing engagement with a similar gear 395 secured to one end of a horizontally disposed shaft 396 which is journaled at one end in the bracket 393 and has the other end thereof journaled in the bracket 397 secured to the bed-plate 2. A pair of axially spaced gears 398 are slidably mounted upon the shaft 396 intermediate the brackets 393 and 397. These gears are splined to the shaft 396 so as to be rotated thereby. These gears are moved in unison and maintained in predetermined spaced relation by means of a U-shaped yoke 399 which is clamped by screws 400 to a horizontally disposed rod 401 which is slidably mounted for axial movement in the bracket 397 and in a cam-supporting bracket 402, as illustrated more clearly in Figures 6 and 82.

The arms of the yoke 399 are bifurcated as at 399' and extend into corresponding peripheral grooves 398' provided in each of the gear members 398, as clearly illustrated in Figure 8, so that any axial movement of the yoke 399 will produce a corresponding axial movement of the gears 398 upon the shaft 396.

A gear 403 is positioned intermediate the gears 398 so as to be operably engaged by said gears. This gear 403 is mounted upon the lower end of an upwardly extending shaft 404 which is journaled at its lower end in the bed-plate 2 and extends upwardly above the bed-plate 2 through vertically spaced bearing members 405 and 406 provided on the bracket 20 near the lower and upper ends thereof respectively, as shown in Figure 5. This shaft 404 is provided with a worm 407 intermediate the bearing members 405 and 406 which is in meshing engagement with a worm nut 408 secured to or made integral with the case 13 so that any rotary movement of the shaft 404 will produce a corresponding vertical movement of the case 13 and the mechanism carried thereby along the guide flanges 21 provided on the bracket 20, when the gibs 23 are released by the manipulation of the screws 22, in the manner hereinbefore described.

This rotary movement of the shaft 404 is produced by action of the motor 7 through the medium of the shafts 388, 392 and 396 and one or the other of the gears 398 which may be brought into meshing engagement with the gear 403 by means of a lever 410 positioned over the bed-plate 2 at one side of the bracket 20 and connected to the upper end of a vertically disposed rock shaft 411 journaled in the bed-plate 2. This shaft 411 extends downwardly through the bed-plate 2 and is connected with one end of the rod 401 by means of a rock arm 412 secured to the lower end of the shaft and a connecting link 413 secured to the outer end of the arm 412 and to one end of the rod 401, as illustrated in Figures 82 and 86.

In order that either one of the gears 398 may be brought out of engagement with the gear 403 for automatically discontinuing the vertical movement of the case 13 after a predetermined movement thereof, I have provided a cam plate 414 which is mounted for vertical reciprocative movement in a guide slot 402' provided in the cam bracket 402 in alignment with a diametrically disposed elongated slot 401' provided in the rod 401.

The cam plate 414 extends through the slot 401' in the rod 401 and has the intermediate portion of the vertical edges thereof provided with cam slots 415 arranged in slightly staggered relation so that when the plate 414 is in either one of its extreme upper or lower positions, the rod 401 may be moved axially in one direction or the other depending upon the position of the cam plate for bringing one or the other of the gears 398 into meshing engagement with the gear 403 to effect a corresponding vertical movement of the case 13. The cam plate 414 is connected with the case 13 by means of a vertically disposed connecting rod 416 which has its lower end connected with the upper end of the cam plate 414 as at 417, and extends upwardly through the base of the bracket 20 and is connected with the case 13 by means of a bracket 418 secured to a gib case 23 and to the upper end of the rod 416, as illustrated in Figures 82 and 87.

It will now be obvious that any vertical movement of the case 13 will produce a corresponding vertical movement of the cam plate 414 so that when the case 13 reaches either one of its extreme upper or lower positions, the cam plate 414 will assume a similar position relative to the rod 401 and move said rod axially due to the cam surface 415' provided at the end of the cam slots 415 engaging the corresponding end of the rod slot 401' to bring the rod 401 and the gears carried thereby into the neutral inoperative position relative to the gear 403.

As illustrated in the drawings, the cam plate 414 is designed to automatically control the operation of the raising and lowering of the case 13 to position the case and the cap-applying and securing mechanism carried thereby relative to the bottle-lifting plunger 106 for capping conventional quart and pint milk bottles, and when it is desired to cap bottles of smaller size, I have provided a manually controlled means whereby the head 13 and mechanism carried thereby may be moved downwardly into closer spaced relation to the plunger 106, then by the power-operating means controlled by the cam plate 414. This manually controlled means consists of a short horizontally disposed shaft 420 journaled in a bearing 421 provided near the upper end of the bracket 20, as illustrated in Figures 2 and 5.

This shaft 420 has the outer end thereof provided with a hand wheel 422 for manipulating the shaft, and the other end has secured thereto a gear 423 which is in meshing engagement with a similar gear 424 secured to the worm shaft 404.

It will now be clearly understood that if the case 13 is in its uppermost position, as illustrated in the drawings, for capping quart bottles, that the head and mechanism carried thereby may be lowered to a position wherein the mechanism is adapted to apply skirted caps to the upper ends of pint bottles through the power-driven mechanism just described, by moving the control arm 410 so as to move the rod 401 to the left, as viewed in Figures 7 and 82 for bringing the right-hand gear 398 into meshing engagement with the gear 403. This will position the right-hand end of the slot 401' in the rod 401 adjacent the vertical wall of the cam plate 414 within the corresponding cam slot 415 so that as the case 13 and the cam plate 414 approach the lower position where the mechanism is adapted to apply caps to pint bottles, the end of the slot 401' will be engaged by the corresponding cam surface 415' at the upper end of the cam groove 415 which will move the rod 401 axially to the right and bring the right-hand gear 398 out of meshing engagement with the gear 403.

When it is desired to again return the capping mechanism to the uppermost position for capping quart bottles, the control arm 410 may be moved in the opposite direction for bringing the left-hand gear 398 into meshing engagement with the gear 403. As the case 13 and the plate 414 approach the uppermost position, the rod 401 and the left-hand gear 398 will again be moved toward the left-hand side due to the cam surface 415' in the cam slot at the left side of the cam plate 414 coming into engagement with the left-hand end of the slot 401' in the rod 401 and thereby again restore the gears 398 to the neutral position and permit the shaft 404 and case 13 to come to rest.

Operation

Assuming that the motor 7 is in operation and that the conveyor A is empty and moving from left to right, as indicated by arrow X, Figure 10, it will be seen that the remainder of the mechanism is at rest due to the clutch 26 being maintained in the disconnected position by the latch release lever 48. The lifting plunger 106 will be in the lowermost position, with the upper end thereof in the plane of the upper surface of the bed-plate 2. The ejector arm 154 and the feed arm 108 will be in the position illustrated in Figure 10 ready to move a bottle from the plunger 106 onto the conveyor A and to move another bottle from the conveyor A onto said plunger. The bottle stop and release arm 89 will be in the outermost operative position for maintaining a bottle against forward movement along the conveyor A, as also illustrated in Figure 10.

Assuming now that the forward disk D of the strip of bottle cap blanks is in position to be fed by the next intermittent movement of the drive roll 225 into concentric relation with the opening 260 in the guide member 248 and that a series of bottles of given size such as quart bottles ready to be capped, appear on the conveyor A. As the forward bottle approaches the trip arm 78, it will engage the roller 79 and actuate said arm to bring the clutch release lever 48 out of engagement with the latch 39 and permit said latch to be moved by the spring 43 into clutching engagement with the drive section 27 of the clutch and cause the drive shaft 12 to be rotated by the motor 7.

As the shaft 12 is thus caused to rotate, the ejector arm 154 will first be caused to move a bottle from the plunger 106 onto the conveyor A, providing a bottle is resting upon said plunger. As the bottle carried by the conveyor leaves the roller 79, it will come into engagement with the stop and release arm 89 and be maintained against further forward movement thereby until the bottle has been moved from the plunger 106 by the ejector arm 154 and guided by the arm 99 onto the conveyor A. As the bottle leaves the arm 99, the cam 94 will have been moved to permit the arm 89 to release the bottle and as said bottle approaches the guide arm 99, said bottle will be engaged by the feed arm 108 and moved from the conveyor A onto the plunger 106, in the manner hereinbefore described.

As soon as the bottle is positioned over the plunger 106, the positioning arms 130 will be actuated to bring the body of the bottle into substantially co-axial alignment with the plunger. As soon as the bottle has been aligned with the plunger 106, said plunger will be raised by the action of the cam 180 upon the arm 174 to produce an upward movement of the bottle and bring the mouth of said bottle into engagement with the cap disk D which will have, in the meantime, been brought into concentric relation with the opening 260 in the guide member 248 and severed from the remaining portion of the strip by the action of the knife 264.

As the head of the bottle approaches the guide member 248, it will engage the bottle-positioning fingers 262 and be brought into concentric relation with the opening 260 in the guide member 248 just prior to the engagement of the head with the cap disk.

As the plunger 106 and the bottle continue the upward vertical movement, the rim of the bottle will engage the cap blank and raise said blank from the guide plate 257 upwardly into contact with the platen 305 which will maintain the disk in fixed relation with the head of the bottle as the bottle and disk continue their upward movement due to the action of the spring 303 upon the platen 305. The continued upward movement of the bottle will bring the skirt portion $x$ of the cap blank into engagement with the lower positioned break-down fingers 298 for first folding said portions of the disk about the head of the bottle, after which the portions $y$ of the blank will engage the upper-positioned break-down fingers 299 to fold said portions about the head of the bottle into overlapping relation with the portions $x$.

Upon the bottle and plunger coming to rest in the uppermost position, the folding fingers 293 will be moved by the action of the cam groove 290 upon the rollers 291 and slides 287 into engagement with the adjacent folded portions of the skirt and press said folded portions into engagement with each other and with the head and upper portion of the neck of the bottle. As the fingers 293 and respective slides 287 reach their innermost positions, the staple mechanism will be actuated by the action of the cam groove 335 upon the rollers 336 and drive blocks 332 to form staples and drive said staples into the adjacent folded portions of the cap skirt for securing said skirt in the folded position.

As soon as the staples have been driven into the skirt, the stapling mechanism and the folding fingers will be returned to their normal outermost inoperative positions by the action of the respective cam grooves 335 and 290 upon said stapling mechanisms and fingers, after which the bottle with the cap secured thereto and the plunger 106 will be returned to their starting positions with the bottom of the bottle flush with the top surface of the bed-plate 2.

As the plunger 106 comes to its lowermost position, the clutch latch 39 will be moved out of clutching engagement with the drive section 27 of the clutch for de-clutching said clutch and permitting the drive shaft 12 and the mechanism operated thereby to come to an at rest position providing no bottle is in contact with the roller 79 of the trip arm 78. If, however, a bottle is in contact with the roller 79 when the plunger returns to its lowermost position, the clutch release arm 48 will be maintained in its outermost position thereby out of the path of movement of the latch member 39 so that the clutch members will remain in operative relation and the motor 7 will continue to rotate the drive shaft 12, in which case the capped bottle upon the plunger 106 will be moved by the action of the ejector arm 154 from the plunger as soon as said plunger and bottle come to the lowermost at-rest position onto the conveyor A and the next succeeding bottle will then be moved from the conveyor A onto the plunger 106 by the action of the feed arm 108 in co-operation with the guide arm 99, and the cycle of operation of the machine for applying a cap to the head of the bottle and securing said cap thereto, as just described, will be repeated.

Although there is shown and particularly described a preferred embodiment of this invention, I do not wish to be limited to the exact construction shown, as various changes in the form, size and relation of the parts thereof may readily be made, without departing from the spirit of this invention as set forth in the appended claims.

I claim:

1. In a bottle-capping machine in which the cap blanks are of sufficient area to skirt the head and neck of a bottle when applied thereto, cap-folding means comprising two sets of break-down members arranged in axial spaced relation with each other for successive engagement with the skirt of the cap blank, means for producing relative movement of a bottle with a cap blank thereon and said members toward each other for bending the skirt of the cap blank over the head of the bottle and to plait said skirt with certain of said plaits in overlapping relation with the other plaits, separate means for folding said plaited skirt about the neck of the bottle, and a supporting enclosed case for the folding means adapted to protect said folding means from moisture.

2. In a bottle capping machine in which the cap blanks are of sufficient area to skirt the head and neck of a bottle when applied thereto, cap folding means comprising two sets of relatively fixed breakdown members arranged in axial spaced relation to each other in position to co-operate directly with a bottle for successive engagement with the skirt of the blank, means for producing relative movement of the bottle with a cap blank thereon and said breakdown members toward each other for bending the marginal portion of the cap blank over the head of the bottle and to plait the cap skirt, and means for securing the skirt of the cap in the folded position.

3. In a bottle capping machine, in which the cap blanks are of sufficient area to skirt the head and neck of a bottle when applied thereto, cap folding means consisting of two sets of breakdown members arranged in axial spaced relation for successive engagement with the skirt of the blank, means for producing relative movement of a bottle with a cap blank thereon and said members toward each other for bending the marginal portion of the cap blank over the head of the bottle and to plait the cap skirt, with certain of said plaits in over-lapping relation with the other plaits, a plurality of stapling means for securing the plaits in the folded position, and cam means for simultaneously operating said stapling means.

4. In a bottle capping machine in which the cap blanks are of sufficient area to skirt the head and neck of a bottle when applied thereto, cap folding means consisting of two sets of breakdown members arranged in axial spaced relation for successive engagement with the skirt of the blank, and means for producing relative movement of a bottle with a cap blank thereon and said members toward each other for bending the marginal portion of the cap blank over the head of the bottle, a plurality of separate means for folding said skirt about the neck of the bottle, a plurality of securing means for fastening the skirt in the folded position, and horizontally disposed cam means associated with the fastening means and the folding means for simultaneously operating the members thereof.

5. In a bottle capping machine in which the cap blanks are of sufficient area to skirt the head and neck of a bottle when applied thereto, cap folding means consisting of two sets of relatively fixed break-down members arranged in axial spaced relation for successive engagement with the skirt of the blank, means for producing relative movement of a bottle with a cap blank thereon and said members toward each other for bending the marginal portion of the cap blank over the head of the bottle and to plait the cap skirt with certain of said plaits in over-lapping relation with the other plaits, and separate means for folding said plaited skirt about the neck of the bottle.

6. In a bottle capping machine in which the cap blanks are of sufficient area to skirt the head and neck of a bottle when applied thereto, cap folding means comprising two sets of breakdown fingers arranged in fixed axial spaced relation to each other and with the fingers of one set intermediate the fingers of the other set whereby the fingers of one set are adapted to fold down corresponding portions of the cap blank and the fingers of the other set are adapted to fold down other portions of said blank, a set of folding fingers arranged co-axially with the breakdown fingers, means for producing relative movement of a bottle with a cap blank thereon and said folding means toward each other, operating means comprising a cam member arranged co-axially with said fingers for simultaneously moving the folding fingers into engagement with the folded down portions of the cap blank at the end of said relative movement of the bottle and breakdown members for folding said portions of the skirt about the neck of the bottle, and a supporting enclosed case for the breakdown fingers, folding fingers and cam member adapted to protect said breakdown fingers, folding fingers and cam member from moisture.

7. In a bottle capping machine in which the cap blanks are of sufficient area to skirt the head and neck of a bottle when applied thereto, cap folding means, means for producing relative movement of a bottle with a cap blank thereon and said folding means toward each other for bending the marginal portion of the cap blank over the head of the bottle and to plait the cap skirt with certain of said plaits in over-lapping relation with the other plaits, spaced folding fingers aligned with the plaits, operating means comprising a cam member simultaneously moving the fingers into and out of engagement with the plaits at the end of said relative movement of the bottle and folding means for folding said plaited skirt about the neck of the bottle, a plurality of stapling means arranged intermediate the folding fingers for securing the skirt of the cap in the folded position, and means comprising a second cam member for simultaneously operating the stapling means.

8. In a bottle-capping machine, the combination with an endless conveyor and a cap-applying mechanism, of bottle actuating means including a pair of spaced swinging elements, each element having lateral movement relative to its axis of movement to bring said element into and out of engagement with a bottle, means for actuating the elements to bring them into successive engagement with the bottle for moving said bottle from the conveyor into operative relation with the cap-forming and applying mechanism and for moving the capped bottle from the position in operative relation with the cap-forming and applying mechanism to said conveyor, and means co-acting with said moving means for guiding the bottle in its movement from and to the conveyor.

9. In a bottle-capping machine, the combination with an endless conveyor and a cap-forming and applying mechanism, of means for moving a bottle from the conveyor into operative relation with the cap-forming and applying mechanism, separate means for moving the capped bottle from the position in operative relation with the cap-forming and applying mechanism to said conveyor, and a pivoted arm co-acting with each of said moving means for guiding the bottle in its movement from and to the conveyor.

10. In a bottle-capping machine, the combination with an endless conveyor and a cap-forming and applying mechanism, of means for moving a bottle from the conveyor into operative relation with the cap-forming and applying mechanism, separate means for moving the capped bottle from the position in operative relation with the cap-forming and applying mechanism to said conveyor, a pivoted arm extending across the conveyor adapted to co-operate with each of said moving means for guiding the bottle in its movement from and to the conveyor, and means yieldingly maintaining the arm in a normal position in co-operative relation with one of the moving means and permitting said arm to be moved into a position in co-operative relation with the other moving means.

11. In a bottle-capping machine, a bottle-supporting mechanism and a cap-forming and applying mechanism, means for supporting said mechanisms whereby they may be moved toward and from each other, power-driven means for producing relative movement of said mechanisms toward and from each other whereby the machine will be adapted to cap bottles of different heights, and means secured to one of said mechanisms for automatically controlling the extent of said relative movement.

12. In a bottle capping machine, the combination with an endless conveyor and a cap applying mechanism, of means for moving a bottle from the conveyor into operative relation with the cap applying mechanism including a bottle contact member, means for swinging the contact member about a fixed axis for moving the bottle, and separate means for producing movement of the contact member relative to said fixed axis to bring said member into and out of position for engagement with the bottle.

13. In a bottle capping machine, the combination with an endless conveyor and a cap applying mechanism, of means for moving a bottle from the conveyor into operative relation with the cap applying mechanism including a bottle contact member, and means having a cam action on the contact member for bringing said member out of engagement with the bottle as the bottle approaches a position in cooperative alignment with the cap applying mechanism.

14. In a bottle capping machine, the combination with an endless conveyor and a cap applying mechanism, of means for moving a bottle from the conveyor into operative relation with the cap applying mechanism including a bottle contact member, means having a cam action on the contact member for bringing said member out of engagement with the bottle as the bottle approaches a position in cooperative alignment with the cap applying mechanism, and separate means yieldingly engaging the bottle for bringing said bottle into co-axial alignment with the cap applying mechanism.

15. In a bottle capping machine, the combination with an endless conveyor and a cap applying mechanism, of actuating means for moving a bottle from the conveyor into operative relation with the cap-applying mechanism, separate actuating means for returning the capped bottle to said conveyor, at least one of said actuating means including a bottle contact member, means for swinging the contact member about a fixed axis for moving the bottle, and separate means for producing movement of the contact member relative to said fixed axis to bring said member into and out of position for engagement with the bottle.

16. In a bottle capping machine, the combination with an endless conveyor and a cap applying mechanism, of actuating means for moving the bottle from the conveyor into operative relation with the cap-applying mechanism, separate actuating means for returning the capped bottle to said conveyor, at least one of said actuating means including a shaft, means for rotating the shaft, a bottle contact member connected with the shaft to be rotated thereby, and means including a cam for producing movement of the contact member laterally of the shaft to bring said member into and out of position for engagement with the bottle.

17. In a bottle capping machine, a bottle supporting member, a cap applying mechanism in cooperative alignment with said member, a pair of elements movable into and out of engagement with the body of a bottle on the supporting member for bringing the bottle body into co-axial alignment with said member, spring means for effecting said engagement of the elements with the bottle, means for producing relative movement of the supporting member and the cap-applying mechanism toward each other to apply a cap to the head of the bottle, and separate means fixedly connected with the cap-applying mechanism and engageable with the head of the bottle during said relative movement for bringing the head of the bottle into co-axial alignment with said cap-applying mechanism.

18. A device as in claim 7 having a supporting case enclosing the folding means, folding fingers, stapling means and cam member, adapted to protect the same from moisture.

19. In a bottle-capping machine in which the cap blanks are of sufficient area to skirt the head and neck of a bottle when applied thereto, a case member, means secured within the case member including elements arranged about a common axis for folding the skirt of the cap blank downwardly over the head of the bottle, a plurality of fingers mounted in the case in circumferentially spaced relation to each other about said axis for movement toward and from the bottle for wrapping the skirt of the cap about the neck of the bottle, a plurality of stapling mechanisms mounted in the case about said axis intermediate the fingers, a cam member rotatably mounted in the case member in close proximity to the fingers and stapling mechanisms, said cam member having a pair of concentrically arranged cam grooves in the surface thereof adjacent said fingers and stapling mechanisms, cam followers connected with the fingers and engaging one of said cam grooves for simultaneously operating said fingers, separate cam followers operably connected with the stapling mechanisms and engaging the second one of said grooves to simultaneously operate said mechanism for securing the cap skirt in said wrapped position, and means for producing relative movement of a bottle with a cap blank thereon and said case toward each other.

20. In a bottle capping machine in which the cap blanks are of sufficient area to skirt the head and neck of a bottle when applied thereto, a case member, means secured within the case about a given axis for folding the skirt of the cap downwardly over the head of a bottle, fingers mounted in the case about said axis for movement toward and from the bottle for wrapping the skirt of the cap about the neck of the bottle, means mounted in the case for operating said fingers, separate means mounted wholly within the case comprising a plurality of stapling mechanisms and a horizontally disposed cam arranged in close proximity to the stapling mechanisms in substantially co-axial relation therewith and with said folding means for simultaneously operating said stapling mechanisms for securing the cap skirt in said wrapped position, and means for producing relative movement of a bottle with a cap blank thereon and said case toward each other.

21. In a bottle capping machine in which the cap blanks are of sufficient area to skirt the head and neck of a bottle when applied thereto, a case member, means secured within the case for folding the skirt of the cap downwardly over the head of a bottle, fingers mounted in the case for movement toward and from the bottle for wrapping the skirt of the cap about the neck of the bottle, a horizontally disposed cam mounted in the case for operating said fingers, a stapling mechanism mounted in the case for securing the skirt of the cap in said wrapped position, a second cam member mounted in the case in co-axial relation with the first mentioned cam for operating the stapling mechanism, and means for producing relative movement of a bottle with a cap blank thereon and said case toward each other.

22. In a bottle-capping machine, a cap forming and applying mechanism including skirt folding members arranged about a common axis, means for positively and intermittently moving a strip of cap blanks to successively bring the cap blanks into operative alignment with said cap forming and applying mechanism, means for pressing the folded skirt of the cap into engagement with the neck of the bottle, means including a rotary cam arranged substantially co-axially with the cap skirt folding members for operating said pressing means, means actuated by said cam for severing a cap blank positioned in alignment with the forming and applying mechanism from said strip, and means for producing relative movement of a bottle with the severed cap blank thereon and said cap forming and applying mechanism toward each other.

23. In a cap applying machine, in combination, a plurality of axially disposed cap blank engaging means comprising an axially movable holder element and two sets of break-down fingers, said sets of fingers being arranged in fixed axial spaced relation to each other and with the fingers of one set intermediate the fingers of the other set whereby the fingers of one set are adapted to fold down portions of the cap blank held by the holder element and the fingers of the other set are adapted to fold down other portions of said blank.

24. A machine as in claim 23 having additional means movable toward and from the axis of said blank engaging means for bringing said folded portions of the blank into contact with other adjacent portions of the blank.

25. In a cap applying machine, in combination, concentric mounted cap blank engaging members, the first constituting a platen for holding a cap blank on top of a container, the second comprising sets of spaced break-down fingers arranged in fixed spaced relation to each other for folding down respective portions of the cap blank engaged by the platen, and the third including means movable relative to the fingers and platen in predetermined relation therewith for pressing said folded portions of the blank against the container.

26. In a cap applying machine, in combination, a cap folding means and means for producing relative movement of said folding means and a container having a cap blank scored to form a central portion, and individual skirt portions positioned on top of the container, said folding means comprising a plurality of axially disposed cap blank engaging means constituting an axially movable holder element for engaging said central portion of the blank and sets of break-down fingers, said sets of fingers being arranged in fixed axial spaced relation to each other and with the fingers of one set intermediate the fingers of the other set whereby the fingers of one set are adapted to fold down portions of the cap blank held by the holder element along score lines and the fingers of the other set are adapted to fold down other portions of said blank along other score lines.

27. A device as in claim 26 having additional folding means engageable with the last mentioned folded blank portions for pressing the folded portion of the cap blank into close contact with the container.

28. A device as in claim 26 having additional folding means engageable with the last mentioned folded blank portions for pressing the folded portion of the cap blank into close contact with the container, and means for securing the cap blank in the folded position.

EDWARD N. LOWRY.